United States Patent
Kim et al.

(10) Patent No.: US 12,520,229 B2
(45) Date of Patent: Jan. 6, 2026

(54) METHOD AND DEVICE FOR PERFORMING GROUPCAST TRANSMISSION IN WIRELESS COMMUNICATION SYSTEM

(71) Applicant: LG ELECTRONICS INC., Seoul (KR)

(72) Inventors: Hyunmin Kim, Seoul (KR); Dongsun Lee, Seoul (KR); Byounggill Kim, Seoul (KR); Jongku Lee, Seoul (KR); Sunam Kim, Seoul (KR); Taehowan Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 357 days.

(21) Appl. No.: 18/031,107

(22) PCT Filed: Oct. 14, 2021

(86) PCT No.: PCT/KR2021/014254
§ 371 (c)(1),
(2) Date: Apr. 10, 2023

(87) PCT Pub. No.: WO2022/080899
PCT Pub. Date: Apr. 21, 2022

(65) Prior Publication Data
US 2023/0403635 A1    Dec. 14, 2023

(30) Foreign Application Priority Data
Oct. 14, 2020    (KR) .................. 10-2020-0132877

(51) Int. Cl.
*H04W 72/25*    (2023.01)
*H04W 8/00*    (2009.01)
(Continued)

(52) U.S. Cl.
CPC ........... *H04W 48/10* (2013.01); *H04W 8/005* (2013.01); *H04W 36/08* (2013.01); *H04W 48/20* (2013.01);
(Continued)

(58) Field of Classification Search
CPC ... H04W 72/25; H04W 72/40; H04W 56/001; H04W 56/002; H04W 88/00; H04W 52/0212; H04W 48/20; H04W 36/08
See application file for complete search history.

(56) References Cited

U.S. PATENT DOCUMENTS

2016/0021495 A1*    1/2016    Segev ............... H04W 4/90
                                               455/456.3
2018/0092017 A1*    3/2018    Freda ............... H04B 7/155
(Continued)

OTHER PUBLICATIONS

ETSI, "TS 138 300 V16.2.0", Jul. 2020, pp. 1-150 (Year: 2020).*

*Primary Examiner* — Salvador E Rivas
(74) *Attorney, Agent, or Firm* — BRYAN CAVE LEIGHTON PAISNER LLP

(57) ABSTRACT

Provided are a method by which a transmission terminal performs groupcast transmission in a wireless communication system, and a device. The method transmits a synchronization signal block (SSB) through an SSB beam, receives, from each of a plurality of terminals, a discovery message as a response to the SSB, determines a groupcast transmission timing for specific terminals from among the plurality of terminals on the basis of the discovery message, transmits, to the specific terminals, a group transmission/reception timing message indicating the groupcast transmission timing, and performs groupcast transmission for the specific terminals by using the SSB beam at the groupcast transmission timing.

13 Claims, 15 Drawing Sheets

(51) Int. Cl.
*H04W 36/08* (2009.01)
*H04W 48/10* (2009.01)
*H04W 48/20* (2009.01)
*H04W 56/00* (2009.01)
*H04W 72/0446* (2023.01)
*H04W 72/40* (2023.01)
*H04W 52/02* (2009.01)
*H04W 88/00* (2009.01)

(52) U.S. Cl.
CPC ....... *H04W 56/001* (2013.01); *H04W 56/002* (2013.01); *H04W 72/0446* (2013.01); *H04W 72/25* (2023.01); *H04W 72/40* (2023.01); *H04W 52/0212* (2013.01); *H04W 88/00* (2013.01)

(56) References Cited

U.S. PATENT DOCUMENTS

| | | | |
|---|---|---|---|
| 2020/0260231 A1* | 8/2020 | Ganesan | H04L 1/1825 |
| 2021/0044956 A1* | 2/2021 | Kim | H04L 1/1854 |
| 2021/0321348 A1* | 10/2021 | Ohara | H04L 5/0048 |
| 2021/0352625 A1* | 11/2021 | Akkarakaran | H04W 72/02 |
| 2022/0039076 A1* | 2/2022 | Choi | H04B 7/0695 |
| 2023/0008786 A1* | 1/2023 | Karjalainen | H04W 16/14 |
| 2023/0217232 A1* | 7/2023 | Cheng | H04L 67/61 |
| | | | 370/328 |

* cited by examiner

METHOD AND DEVICE FOR PERFORMING GROUPCAST TRANSMISSION IN WIRELESS COMMUNICATION SYSTEM

CROSS-REFERENCE TO RELATED APPLICATIONS

This application is the National Stage filing under 35 U.S.C. 371 of International Application No. PCT/KR2021/014254, filed on Oct. 14, 2021, which claims the benefit of Korean Patent Application No. 10-2020-0132877 filed on Oct. 14, 2020, the contents of which are all hereby incorporated by reference herein in their entirety.

TECHNICAL FIELD

This specification relates to a groupcast transmission operation in a wireless communication system.

BACKGROUND

Recently, interest in D2D (Device-to-Device) technology for direct communication between devices is increasing. D2D communication can be extended and applied to signal transmission and reception between vehicles, and communication related to vehicles is called vehicle-to-everything (V2X) communication.

The "X" in V2X can be various, such as pedestrian, vehicle, infrastructure/network, etc., which in turn can be labeled as V2P, V2V, V2I/V2N, etc.

V2X communications can also support beam-based transmission. Beamforming techniques, which concentrate signals into narrow transmission angles to overcome the high path losses associated with using high frequency bands such as THz (terahertz), can also be supported for V2X communications.

The beam is directional, has a limited width, and is transmitted as a single beam at one point in time. In the case of THz, the beam is so narrow that it is often referred to as a pencil beam, so there is a high probability of transmitting data for a single user equipment (UE) on a single beam.

On the other hand, since groupcast requires the same data to be transmitted to multiple UEs, it may not be efficient to use a beam with a very narrow transmission angle (width) for groupcast. In other words, if a beam with a very narrow transmission angle (width) is used for groupcast to transmit the same data to multiple UEs, the same data would have to be transmitted to each UE using different beams, which would be resource inefficient and time consuming.

There is a need for a groupcast transmission method and apparatus considering these points.

SUMMARY

It is intended to provide a groupcast transmission method and an apparatus using the method in a wireless communication system.

In one aspect, provided is a method of performing a groupcast transmission by a transmitting user equipment (UE) in a wireless communication system. The method includes transmitting a synchronization signal block (SSB) via an SSB beam, receiving a discovery message in response to the SSB from each of a plurality of UEs, determining, based on the discovery message, a groupcast transmission timing for specific UEs among the plurality of UEs, transmitting a group transmission-reception (Tx-Rx) timing message informing of the groupcast transmission timing to the specific UEs and performing a groupcast transmission using the SSB beam to the specific UEs at the groupcast transmission timing.

In another aspect, provided is an apparatus that performs a groupcast transmission. The apparatus includes a transceiver, at least one memory and at least one processor operably coupled with the at least one memory and the transceiver. The processor is adapted to: transmit a synchronization signal block (SSB) via an SSB beam, receive a discovery message in response to the SSB from each of a plurality of UEs, determine, based on the discovery message, a groupcast transmission timing for specific UEs among the plurality of UEs, transmit a group transmission-reception (Tx-Rx) timing message informing of the groupcast transmission timing to the specific UEs and perform a groupcast transmission using the SSB beam to the specific UEs at the groupcast transmission timing.

In still another aspect, provided is a chipset. The chipset includes at least one memory, and at least one processor operably coupled to the at least one memory. The processor is adapted to: transmit a synchronization signal block (SSB) via an SSB beam, receive a discovery message in response to the SSB from each of a plurality of UEs, determine, based on the discovery message, a groupcast transmission timing for specific UEs among the plurality of UEs, transmit a group transmission-reception (Tx-Rx) timing message informing of the groupcast transmission timing to the specific UEs and perform a groupcast transmission using the SSB beam to the specific UEs at the groupcast transmission timing.

In still another aspect, provided is a computer readable medium (CRM) storing instructions to cause an operation to be performed by one or more processors, the operation comprising: transmitting a synchronization signal block (SSB) via an SSB beam, receiving a discovery message in response to the SSB from each of a plurality of UEs, determining, based on the discovery message, a groupcast transmission timing for specific UEs among the plurality of UEs, transmitting a group transmission-reception (Tx-Rx) timing message informing of the groupcast transmission timing to the specific UEs and performing a groupcast transmission using the SSB beam to the specific UEs at the groupcast transmission timing.

In still another aspect, provided is a method of operating a receiving user equipment (UE) in a wireless communication system. The method includes receiving a synchronization signal block (SSB) from a transmitting UE through an SSB beam, transmitting a discovery message to the transmitting UE in response to the SSB, receiving a group transmission-reception (Tx-Rx) timing message indicating a groupcast transmission timing based on the discovery message from the transmitting UE and receiving groupcast data from the transmission UE using the SSB beam at the groupcast transmission timing.

In still another aspect, provided is a receiving user equipment (UE). The receiving UE includes a transceiver, at least one memory and at least one processor operably coupled with the at least one memory and the transceiver. The processor is adapted to: receive a synchronization signal block (SSB) from a transmitting UE through an SSB beam, transmit a discovery message to the transmitting UE in response to the SSB, receive a group transmission-reception (Tx-Rx) timing message indicating a groupcast transmission timing based on the discovery message from the transmitting UE and receive groupcast data from the transmission UE using the SSB beam at the groupcast transmission timing.

Instead of transmitting data to a plurality of UEs in a method of transmitting the same data multiple times using different beams, data is transmitted to a plurality of UEs aligned with the SSB beam using an SSB beam having a relatively large transmission angle (width). Therefore, resource efficiency is high. In addition, for UEs that feedback NACK for group-cast data, it is possible to improve the efficiency of group-cast operation by retransmitting data in the unicast duration instead of the group-cast duration using a beam with a narrow transmission angle (width) as before, and transmitting new data in the group-cast duration. The effects of the specific examples in this specification are not limited to those listed above. For example, there may be various technical effects that a person having ordinary skill in the relevant art would understand or infer from the present disclosure. Accordingly, the specific effects of the disclosure are not limited to those expressly set forth herein, but may include various effects that may be understood or inferred from the technical features of the disclosure.

DETAILED DESCRIPTION

In this specification, "A or B" may mean "only A", "only B", or "both A and B". In other words, "A or B" herein may be interpreted as "A and/or B". For example, "A, B or C" herein means "only A", "only B", "only C", or "any and any combination of A, B and C".

As used herein, a slash (/) or a comma (comma) may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, in this specification, the expression "at least one of A or B" or "at least one of A and/or B" means "at least one of A and B".

Also, as used herein, "at least one of A, B and C" means "only A", "only B", "only C", or "any combination of A, B and C". In addition, "at least one of A, B or C" or "at least one of A, B and/or C" means can mean "at least one of A, B and C".

In addition, parentheses used herein may mean "for example". Specifically, when displayed as "control information (PDCCH)", "PDCCH" may be proposed as an example of "control information". In other words, "control information" in the present specification is not limited to "PDCCH", and "PDCCH" may be proposed as an example of "control information". In addition, even when displayed as "control information (i.e., PDCCH)", "PDCCH" may be proposed as an example of "control information".

Technical features that are individually described in one drawing in this specification may be implemented individually or may be implemented at the same time.

Hereinafter, new radio access technology (new RAT, NR) will be described.

As more and more communication devices require more communication capacity, there is a need for improved mobile broadband communication over conventional radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present disclosure for convenience.

Figure 1:
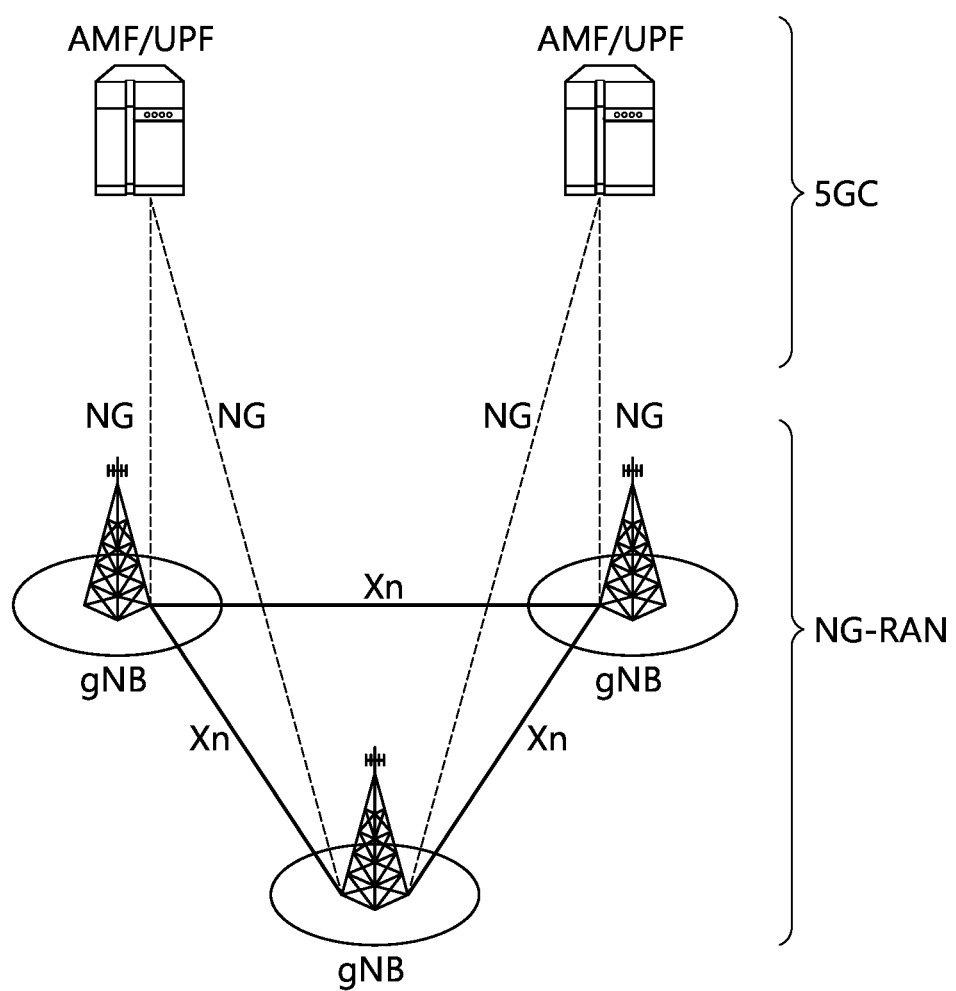
FIG. 1 illustrates a system structure of a New Generation Radio Access Network (NG-RAN) to which NR is applied.

FIG. 1 illustrates a system structure of a next generation radio access network (NG-RAN) to which NR is applied.

Referring to FIG. 1, the NG-RAN may include a gNB and/or an eNB that provides user plane and control plane protocol termination to a UE. FIG. 1 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

NR supports multiple numerology or, subcarrier spacing (SCS) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHZ | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHZ | 60, 120, 240 kHz |

Here, the wireless communication technology implemented in the wireless device of the present specification may include narrowband IoT (NB-IoT) for low-power communication as well as LTE, NR, and 6G. For example, the NB-IoT technology may be an example of a LPWAN (Low Power Wide Area Network) technology, and may be implemented in standards such as LTE Cat NB1 and/or LTE Cat NB2, and is not limited to the above-mentioned name Additionally or alternatively, the wireless communication technology implemented in the wireless device of the present specification may perform communication based on LTE-M technology. For example, the LTE-M technology may be an example of an LPWAN technology, and may be called by various names such as enhanced MTC (eMTC). For example, LTE-M technology may be implemented in at least one of various standards such as 1) LTE CAT 0, 2) LTE Cat M1, 3) LTE Cat M2, 4) LTE non-BL (Non-Bandwidth Limited), 5) LTE-MTC, 6) LTE MTC, and/or 7) LTE M, and is not limited to the above-described name. Additionally or alternatively, the wireless communication technology implemented in the wireless device of the present specification may include at least one of ZigBee, Bluetooth, and/or LPWAN in consideration of low-power communication, and it is not limited to the above-mentioned names. For example, the ZigBee technology may create PANs (Personal Area Networks) related to small/low-power digital communication based on various standards such as IEEE 802.15.4, and may be called by various names.

Figure 2:
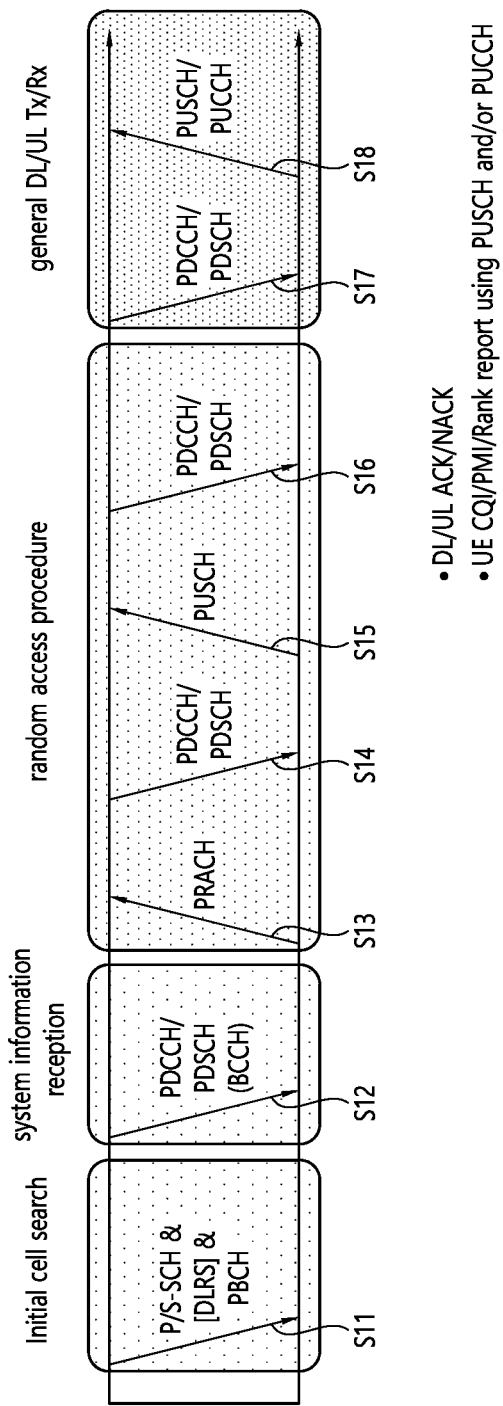
FIG. 2 illustrates physical channels and typical signal transmission used in a 3GPP system.

FIG. 2 illustrates physical channels and general signal transmission used in a 3GPP system. In a wireless communication system, a UE receives information from a base station through a downlink (DL), and the UE transmits information to a base station through an uplink (UL). The information transmitted and received between the base station and the UE includes data and various control information, and various physical channels exist according to the type/use of the information they transmit and receive.

When the UE is powered on or newly enters a cell, the UE performs an initial cell search operation such as synchronizing with the base station (S11). To this end, the UE receives a primary synchronization signal (PSS) and a secondary synchronization signal (SSS) from the base station, synchronizes with the base station, and obtains information such as a cell ID. Thereafter, the UE may receive a physical broadcast channel (PBCH) from the base station to obtain intra-cell broadcast information. Meanwhile, the UE may receive a downlink reference signal (DL RS) in the initial cell search step to check the downlink channel state.

After the initial cell search, the UE may receive a Physical Downlink Control Channel (PDCCH) and a Physical Downlink Control Channel (PDSCH) according to information carried on the PDCCH to obtain more specific system information (S12).

On the other hand, when accessing the base station for the first time or there is no radio resource for signal transmission, the UE may perform a random access procedure (RACH) to the base station (S13 to S16). To this end, the UE transmits a specific sequence as a preamble through a Physical Random Access Channel (PRACH) (S13 and S15), a response message ((Random Access Response (RAR) message) for the preamble may be received through the PDCCH and the corresponding PDSCH. In the case of contention-based RACH, a contention resolution procedure may be additionally performed (S16).

After performing the procedure as described above, the UE may perform PDCCH/PDSCH reception (S17) and Physical Uplink Shared Channel (PUSCH)/Physical Uplink Control Channel (PUCCH) transmission (S18) as a general uplink/downlink signal transmission procedure. In particular, the UE may receive downlink control information (DCI) through the PDCCH. Here, the DCI includes control information such as resource allocation information for the UE, and different formats may be applied according to the purpose of use.

On the other hand, the control information transmitted by the UE to the base station through the uplink or received by the UE from the base station is a downlink/uplink ACK/NACK signal, a channel quality indicator (CQI), a precoding matrix index (PMI), and a rank indicator (RI) and the like. The UE may transmit the above-described control information such as CQI/PMI/RI through PUSCH and/or PUCCH.

<Structure of Uplink and Downlink Channels>

1. Downlink Channel Structure

The base station may transmit a related signal to the UE through a downlink channel to be described later, and the UE may receive a related signal from the base station through a downlink channel to be described later.

(1) Physical Downlink Shared Channel (PDSCH)

PDSCH carries downlink data (e.g., DL-shared channel transport block, DL-SCH TB), and modulation methods such as Quadrature Phase Shift Keying (QPSK), 16 Quadrature Amplitude Modulation (QAM), 64 QAM, and 256 QAM are applied to the PDSCH. A codeword is generated by encoding a transport block (TB). A PDSCH can carry multiple codewords. Scrambling and modulation mapping are performed for each codeword, and modulation symbols generated from each codeword are mapped to one or more layers (Layer mapping). Each layer is mapped to a resource together with a demodulation reference signal (DMRS), is generated as an OFDM symbol signal, and is transmitted through a corresponding antenna port.

(2) Physical Downlink Control Channel (PDCCH)

The PDCCH carries downlink control information (DCI) and a QPSK modulation method is applied. One PDCCH is composed of 1, 2, 4, 8, 16 CCEs (Control Channel Elements) according to an Aggregation Level (AL). One CCE consists of six REGs (Resource Element Groups). One REG is defined as one OFDM symbol and one (P)RB.

The UE obtains DCI transmitted through the PDCCH by performing decoding (also known as, blind decoding) on a set of PDCCH candidates. A set of PDCCH candidates decoded by the UE is defined as a PDCCH search space set. The search space set may be a common search space or a UE-specific search space. The UE may acquire DCI by monitoring PDCCH candidates in one or more search space sets configured by MIB or higher layer signaling.

2. Uplink Channel Structure

The UE transmits a related signal to the base station through an uplink channel to be described later, and the base station receives the related signal from the UE through an uplink channel to be described later.

(1) Physical Uplink Shared Channel (PUSCH)

PUSCH carries uplink data (e.g., UL-shared channel transport block, UL-SCH TB) and/or uplink control information (UCI), and is transmitted based on the waveform such as CP-OFDM (Cyclic Prefix—Orthogonal Frequency Division Multiplexing) waveform, DFT-s-OFDM (Discrete Fourier Transform-spread-Orthogonal Frequency Division Multiplexing) waveform, etc. When the PUSCH is transmitted based on the DFT-s-OFDM waveform, the UE transmits the PUSCH by applying transform precoding. For example, when transform precoding is not possible (e.g., transform precoding is disabled), the UE transmits a PUSCH based on a CP-OFDM waveform, and when transform precoding is possible (e.g., transform precoding is enabled), the UE may transmit a PUSCH based on a CP-OFDM waveform or a DFT-s-OFDM waveform. PUSCH transmission is dynamically scheduled by a UL grant in DCI, or may be semi-statically scheduled (configured grant) based on higher layer (e.g., RRC) signaling (and/or Layer 1 (L1) signaling (e.g., PDCCH)). PUSCH transmission may be performed on a codebook-based or non-codebook-based basis.

(2) Physical Uplink Control Channel (PUCCH)

The PUCCH carries uplink control information, HARQ-ACK, and/or a scheduling request (SR), and may be divided into a plurality of PUCCHs according to a PUCCH transmission length.

<6G System General>

6G (radio communication) system is aimed at (i) very high data rate per device (apparatus), (ii) very large number of connected devices, (iii) global connectivity, (iv) very low latency, (v) lower energy consumption of battery-free IoT devices, (vi) ultra-reliable connectivity, and (vii) connected intelligence with machine learning capabilities. The vision of the 6G system can be four aspects such as intelligent connectivity, deep connectivity, holographic connectivity, and ubiquitous connectivity, and the 6G system can satisfy the requirements shown in Table 3 below. That is, Table 3 is a table showing an example of requirements for a 6G system.

TABLE 3

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| Artificial Intelligence (AI) | Fully |
| Autonomous vehicle | Fully |
| Extended Reality (XR) | Fully |
| Haptic Communication | Fully |

The 6G system can have key factors such as enhanced mobile broadband (eMBB), ultra-reliable low latency communications (URLLC), massive machine-type communication (mMTC), artificial intelligence integrated communication (AI), tactile internet, high throughput, high network capacity, high energy efficiency, low backhaul and access network congestion, and enhanced data security.

Figure 3:
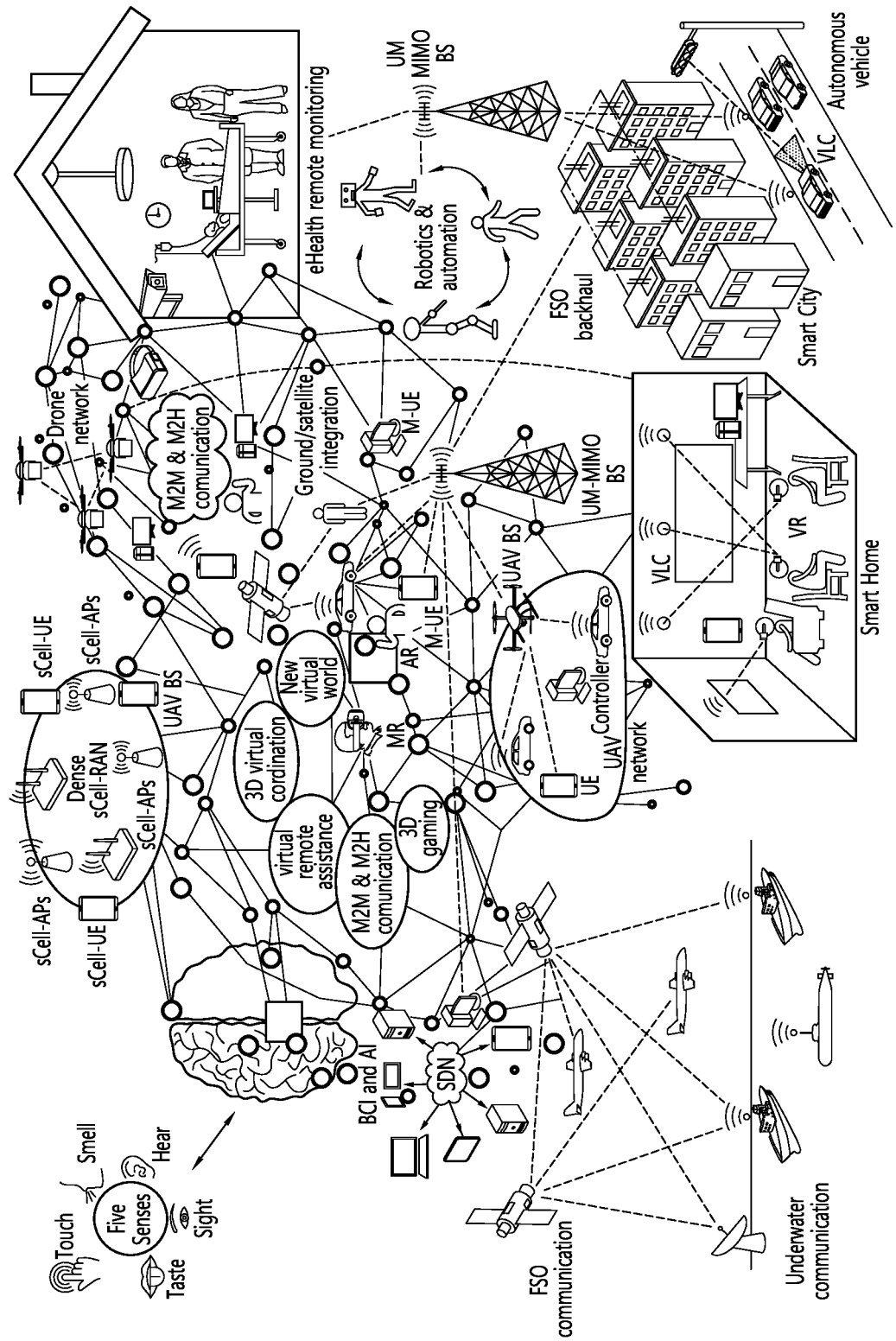
FIG. 3 is a diagram showing an example of a communication structure that can be provided in a 6G system.

FIG. 3 is a diagram showing an example of a communication structure that can be provided in a 6G system.

6G systems are expected to have 50 times higher simultaneous radio connectivity than 5G radio systems. URLLC, a key feature of 5G, will become a more dominant technology in 6G communications by providing end-to-end delay of less than 1 ms. 6G systems will have much better volumetric spectral efficiency as opposed to the more commonly used area spectral efficiency. 6G systems will be able to offer very long battery life and advanced battery technologies for energy harvesting, so mobile devices will not need to be charged separately in a 6G system. New network characteristics in 6G may include the following Satellites integrated network: 6G is expected to be integrated with satellites to serve the global mobile population. Integration of terrestrial, satellite and public networks into one wireless communication system is critical for 6G.

Connected intelligence: Unlike previous generations of wireless communications systems, 6G is revolutionary and will update the evolution of wireless from "connected things" to "connected intelligence." AI can be applied at each step of the communication procedure (or each procedure of signal processing to be described later).

Seamless integration wireless information and energy transfer: 6G wireless networks will transfer power to charge the batteries of devices such as smartphones and sensors. Therefore, wireless information and energy transfer (WIET) will be integrated.

Ubiquitous super 3D connectivity: Access to networks and core network capabilities of drones and very low Earth orbit satellites will make super 3D connectivity in 6G ubiquitous.

In the new network characteristics of 6G as above, some general requirements can be as follows.

Small cell networks: The idea of small cell networks has been introduced to improve received signal quality resulting in improved throughput, energy efficiency and spectral efficiency in cellular systems. As a result, small cell networks are an essential feature of 5G and beyond 5G (5 GB) and beyond communication systems. Therefore, the 6G communication system also adopts the characteristics of the small cell network.

Ultra-dense heterogeneous network: Ultra-dense heterogeneous networks will be another important feature of 6G communication systems. Multi-tier networks composed of heterogeneous networks improve overall QoS and reduce costs.

High-capacity backhaul: A backhaul connection is characterized by a high-capacity backhaul network to support high-capacity traffic. High-speed fiber and free space optical (FSO) systems may be possible solutions to this problem.

Radar technology integrated with mobile technology: High-precision localization (or location-based service) through communication is one of the features of 6G wireless communication systems. Thus, radar systems will be integrated with 6G networks.

Softwarization and virtualization: Softwarization and virtualization are two important features fundamental to the design process in 5 GB networks to ensure flexibility, reconfigurability and programmability. In addition, billions of devices can be shared in a shared physical infrastructure.

<THz (Terahertz) Communication>

Figure 4:
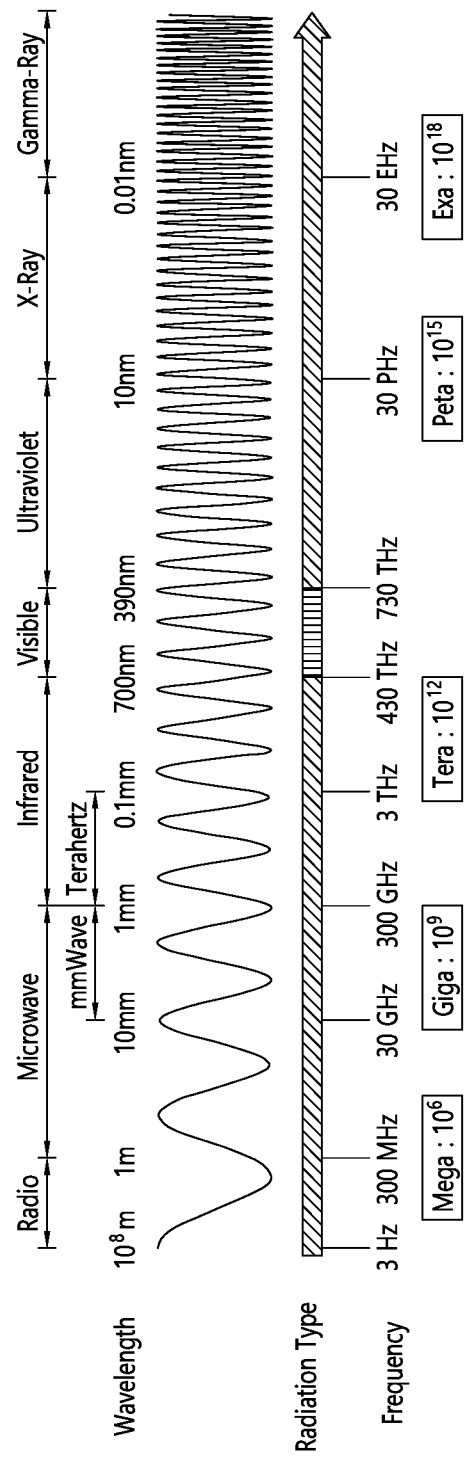
FIG. 4 illustrates the electromagnetic spectrum.

FIG. 4 illustrates the electromagnetic spectrum.

The data rate can be increased by increasing the bandwidth. This can be done using sub-THz communication with wide bandwidth and applying advanced massive MIMO technology. THz waves, also known as submillimeter radiation, typically represent a frequency band between 0.1 THz and 10 THz with corresponding wavelengths in the range of 0.03 mm-3 mm. The 100 GHz-300 GHz band range (sub THz band) is considered a major part of the THz band for cellular communications. Adding sub-THz bands to mmWave bands increases 6G cellular capacity. Among the defined THz bands, 300 GHz-3 THz is in the far infrared (IR) frequency band.

The main characteristics of THz communications include (i) widely available bandwidth to support very high data rates, and (ii) high path loss at high frequencies (highly directional antennas are indispensable). The narrow beamwidth produced by the highly directional antenna reduces interference. The small wavelength of the THz signal allows a much larger number of antenna elements to be incorporated into devices and/or base stations operating in this band. This enables advanced adaptive array technology to overcome range limitations.

The present disclosure will now be described.

This disclosure relates to an efficient groupcast technique in a THz-based V2X sidelink.

The beam is directional, has a limited width, and is transmitted as one beam at a time. In the case of THz (terahertz), since the width of a beam is narrow enough to be called a pencil beam, there is a high probability of transmitting data for one UE in one beam.

Due to the characteristics of Groupcast, the same data must be transmitted to several UEs, but the operation of transmitting the same data to each of the several UEs through different beams may reduce resource efficiency.

Due to the nature of V2X (Vehicle to Everything), transmission timing of feedback messages through PSFCH (Physical Sidelink Feedback Channel) is dependent on a resource pool, and feedback can be transmitted at a fixed point in time when data is transmitted. Due to the nature of the beam, which is inevitably capable of one-to-one (1:1) communication, it may not be suitable for groupcast that requires fast communication. In order to solve this problem, a method of organically operating a beam covering a wider area for transmitting SSBs is proposed.

Groupcast was added in V2X rel-16. Groupcast is used when a transmitting UE wants to deliver a certain message to a plurality of UEs and uses a group ID (identity). The groupcast is designed to perform an HARQ procedure, and there may be two methods for the HARQ procedure. First, there is a general HARQ process, and there is a NACK only process. Here, a general HARQ process means that after receiving data, ACK is fed back when the data is successfully decoded, and NACK is fed back when the data is not successfully decoded.

On the other hand, NACK only means that the receiving UE delivers/feeds back the NACK message to the transmitting UE only when a NACK occurs, and does not forward/feedback other than that. The transmitting UE retransmits data only when it receives a NACK, and processes the rest with ACK.

In the prior art, when a transmitting UE transmits data through a groupcast, it discovers UEs belonging to the group, transmits a configuration message for the groupcast, and then transmits the data. At this time, when using a beam, the same data must be repeatedly transmitted in a TDD scheme like unicast.

In this disclosure, the focus is on minimizing the TDD scheme of such a beam.

Figure 5:
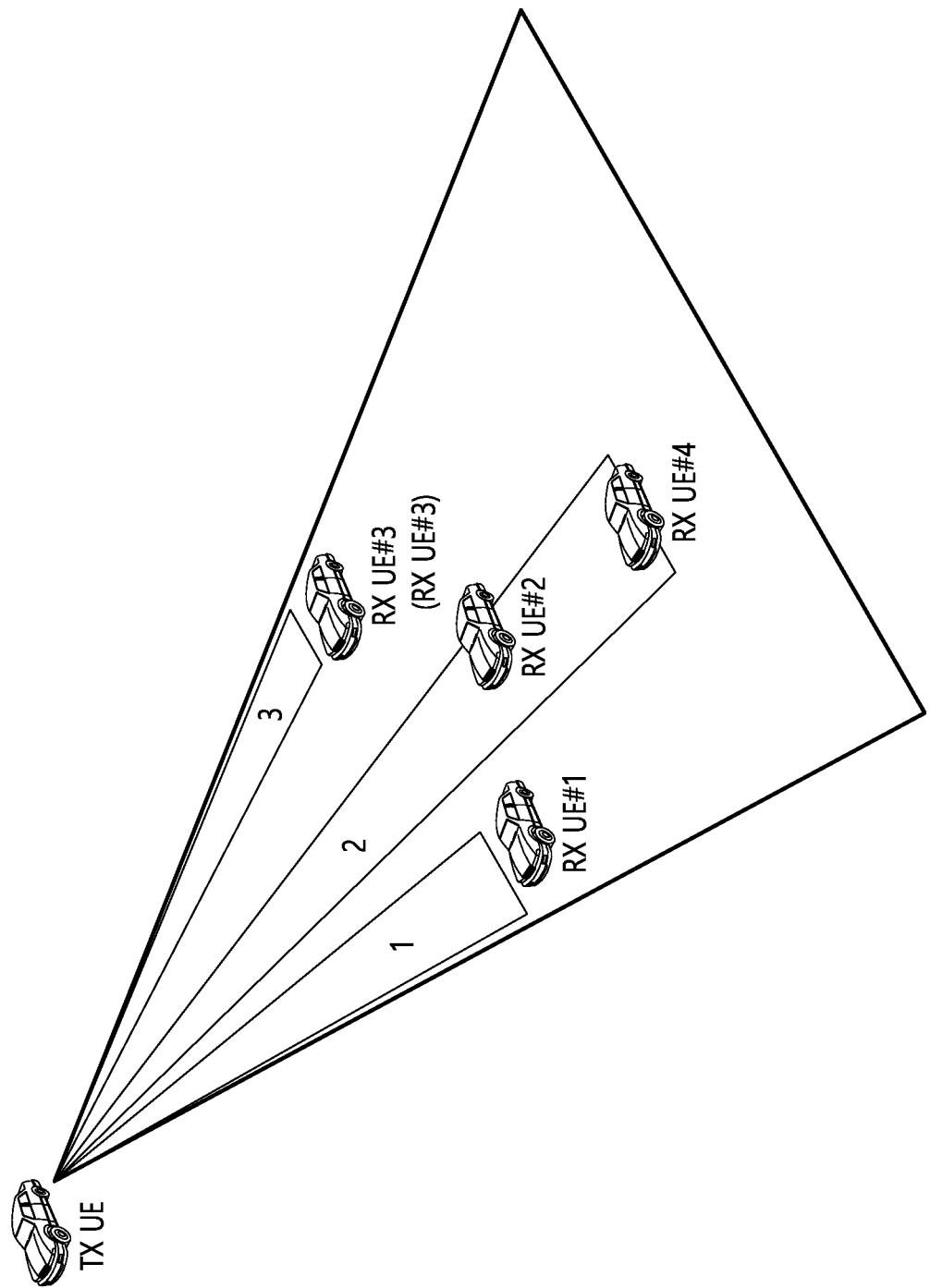
FIG. 5 illustrates transmission of data from a transmitting UE (Tx UE) to a receiving UE (Rx UE).

FIG. 5 illustrates transmission of data from a transmitting UE (Tx UE) to a receiving UE (Rx UE).

Referring to FIG. 5, receiving UEs #2 and 4 may be UEs capable of receiving a channel state information-reference signal (CSI-RS) which is quasi co located (QCL) with the same SSB. The CSI-RS may be a reference signal transmitted to determine a channel state. The receiving UE may measure the CSI-RS to determine the channel state and then feed back the channel state information.

The transmitting UE (Tx UE) may perform a groupcast to the receiving UEs #2 and 4 using the same SSB beam.

When there are a plurality of UEs capable of receiving CSI-RS which is quasi co located (QCL) with the SSB, data can be transmitted to the UEs at once using an SSB beam and feedback can be received at the same time. This operation has an advantage in that data can be transmitted more quickly to UEs belonging to the same group, and by receiving feedback at the same time, it has the advantage of being able to quickly take action for retransmission.

Hereinafter, it may be assumed that UEs receiving groupcast data exist outside the coverage of the base station. And, it can be assumed that a plurality of UEs are aligned to one SSB beam.

Figure 6:
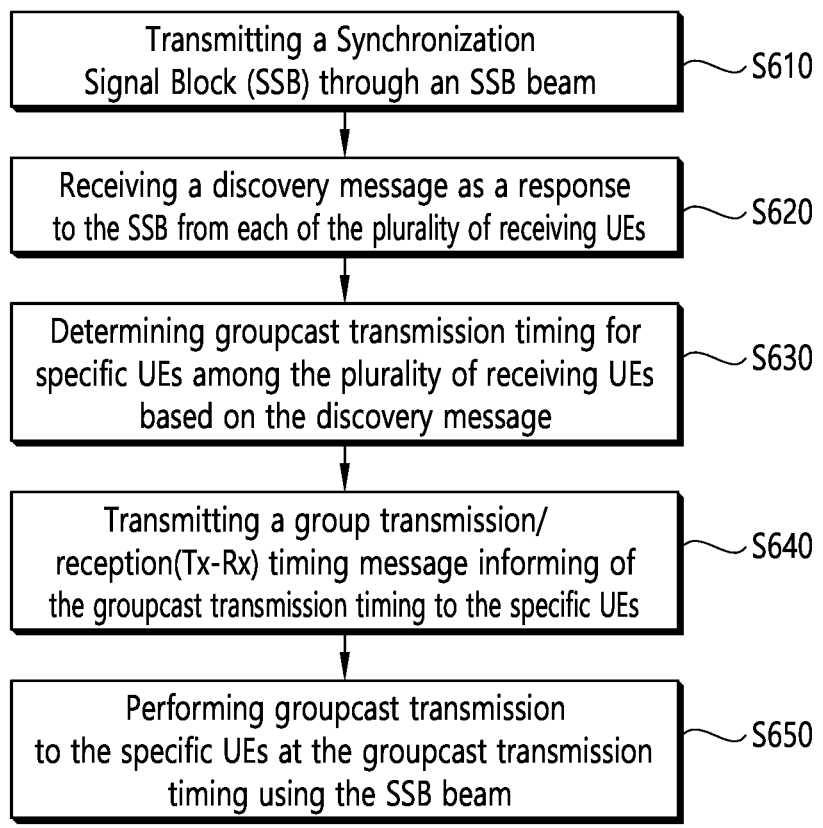
FIG. 6 illustrates a method of performing groupcast transmission in a wireless communication system.

FIG. 6 illustrates a method of performing groupcast transmission in a wireless communication system.

Referring to FIG. 6, a transmitting UE transmits a Synchronization Signal Block (SSB) through an SSB beam (S610). Here, the SSB may be a sidelink SSB (hereinafter referred to as S-SSB) used for sidelink. The S-SSB may include a Sidelink Synchronization Signal (SLSS) and a Physical Sidelink Broadcast Channel (PSBCH).

The SLSS is a SL-specific sequence and may include a Primary Sidelink Synchronization Signal (PSSS) and a Secondary Sidelink Synchronization Signal (SSSS). The PSSS may be referred to as a sidelink primary synchronization signal (S-PSS), and the SSSS may be referred to as a sidelink secondary synchronization signal (S-SSS). For example, length-127 M-sequences can be used for S-PSS, and length-127 Gold-sequences can be used for S-SSS. For example, the UE can detect an initial signal using S-PSS and acquire synchronization. For example, the UE may obtain detailed synchronization using S-PSS and S-SSS and detect a synchronization signal ID.

PSBCH (Physical Sidelink Broadcast Channel) may be a (broadcasting) channel through which basic (system) information that a UE needs to know first before transmitting and receiving an SL signal is transmitted. For example, the basic information may be SLSS-related information, duplex mode (DM), TDD UL/Time Division Duplex Uplink/Downlink (TDD UL/DL) configuration, resource pool-related information, types of applications related to SLSS, a subframe offset, broadcast information, and the like. For example, for evaluation of PSBCH performance, in NR V2X, the payload size of PSBCH may be 56 bits including a 24-bit CRC.

S-PSS, S-SSS, and PSBCH may be included in a block format supporting periodic transmission, that is, S-SSB.

The S-SSB may have the same numerology (i.e., SCS and CP length) as a physical sidelink control channel (PSCCH)/physical sidelink shared channel (PSSCH) in the carrier, and the transmission bandwidth may be (pre) configured SL BWP (Sidelink BWP). For example, the bandwidth of the S-SSB may be 11 Resource Blocks (RBs). For example, PSBCH may span 11 RBs. And, the frequency position of the S-SSB may be set (in advance). Therefore, the UE does not need to perform hypothesis detection in frequency to discover the S-SSB in the carrier.

Meanwhile, in the NR SL system, a plurality of numerologies having different SCS and/or CP lengths may be supported. In this case, as the SCS increases, the length of time resources through which the transmitting UE transmits the S-SSB may be shortened. Accordingly, coverage of the S-SSB may decrease. Therefore, in order to guarantee coverage of the S-SSB, the transmitting UE may transmit one or more S-SSBs to the receiving UE within one S-SSB transmission duration according to the SCS. For example, the number of S-SSBs that the transmitting UE transmits to the receiving UE within one S-SSB transmission duration may be pre-configured or configured for the transmitting UE. For example, the S-SSB transmission duration may be 160 ms. For example, for all SCSs, an S-SSB transmission duration of 160 ms may be supported.

For example, when the SCS is 15 kHz in FR1, the transmitting UE may transmit one or two S-SSBs to the receiving UE within one S-SSB transmission duration. For example, when the SCS is 30 kHz in FR1, the transmitting UE may transmit one or two S-SSBs to the receiving UE within one S-SSB transmission duration. For example, when the SCS is 60 kHz in FR1, the transmitting UE may transmit one, two or four S-SSBs to the receiving UE within one S-SSB transmission duration.

For example, when the SCS is 60 kHz in FR2, the transmitting UE can transmit 1, 2, 4, 8, 16 or 32 S-SSBs to the receiving UE within one S-SSB transmission duration. For example, if the SCS is 120 kHz in FR2, the transmitting UE can transmit 1, 2, 4, 8, 16, 32 or 64 S-SSBs to the receiving UE within one S-SSB transmission duration.

Meanwhile, when the SCS is 60 kHz, two types of CPs may be supported. In addition, the structure of the S-SSB transmitted from the transmitting UE to the receiving UE may be different according to the CP type. For example, the CP type may be Normal CP (NCP) or Extended CP (ECP). Specifically, for example, when the CP type is NCP, the number of symbols mapping the PSBCH in the S-SSB transmitted by the transmitting UE may be 9 or 8. On the other hand, for example, when the CP type is ECP, the number of symbols mapping the PSBCH in the S-SSB transmitted by the transmitting UE may be 7 or 6. For example, a PSBCH may be mapped to a first symbol in an S-SSB transmitted by a transmitting UE.

The SSB beam is a beam with a relatively wide transmission angle (width) used to transmit the SSB. A beam having a relatively narrow transmission angle (width) used in unicast compared to an SSB beam may be referred to as a conventional transmission beam. A conventional transmission beam may be referred to as a CSI-RS beam.

The transmitting UE receives a discovery message as a response to the SSB from each of the plurality of receiving UEs that have received the SSB (S620).

The transmitting UE determines groupcast transmission timing for specific UEs among the plurality of receiving UEs based on the discovery message (S630).

Thereafter, the transmitting UE transmits a group transmission/reception (Tx-Rx) timing message informing of the groupcast transmission timing to the specific UEs (S640).

Thereafter, the transmitting UE performs groupcast transmission to the specific UEs at the groupcast transmission timing using the SSB beam (a beam to which the same parameter as the SSB beam is applied) (S650).

The specific UEs may be UEs capable of receiving a channel state information-reference signal (CSI-RS) having a quasi co location (QCL) with the SSB.

Describe QCL. If the characteristics of a channel through which symbols on one antenna port are transmitted can be inferred from the characteristics of a channel through which symbols on the other antenna port are transmitted, the two antenna ports are said to be in a quasi-co-location (QCL). For example, when two signals A and B are transmitted from the same transmit antenna array to which the same/similar spatial filter is applied, the two signals may experience the same/similar channel state. From the receiver's point of view, when one of the two signals is received, another signal can be detected using channel characteristics of the received signal.

In this sense, that A and B are QCL may mean that A and B experienced similar channel conditions, and therefore, channel information estimated to detect A is also useful for detecting B. Here, the channel condition may be defined by, for example, Doppler shift, Doppler spread, average delay, delay spread, and spatial reception (Rx) parameters.

The 'TCI-State' parameter associates one or two downlink reference signals to a corresponding QCL type (there are QCL types A (Doppler shift, Doppler spread, average delay, delay spread), B (Doppler shift, Doppler spread), C (Doppler shift, average delay), and D (Spatial Rx parameter)). Each 'TCI-State' may contain parameters to configure a quasi-co-location (QCL) relationship between one or two downlink reference signals and the DM-RS port of the PDSCH (or PDCCH), or the CSI-RS port of the CSI-RS resource.

The discovery message may comprise at least one of information about when the receiving UE to which the discovery message was sent can receive data from the transmitting UE, information about a frequency at which the data can be received, power information about the SSB, and information indicating a type of service that the receiving UE can support.

For example, if the discovery message includes information indicating a type of service that the receiving UE can support, the transmitting UE may determine a group identity for the receiving UE based on the information indicating a type of service that the receiving UE can support, and inform the receiving UE of the group ID through the group Tx-Rx timing message.

Before performing groupcast transmission, the transmitting UE transmits sidelink control information (SCI) to the receiving UE, and whether the SCI is for the receiving UE may be identified based on the group ID.

The transmitting UE receives an acknowledgment/negative-acknowledgment (ACK/NACK) from at least one of the specific UEs, and data retransmission may be performed using a beam (conventional transmission beam, CSI-RS beam) other than the SSB beam at a timing other than the groupcast transmission timing only for the UE receiving the NACK.

Through the groupcast transmission, sidelink control information (SCI) for each of the specific UEs is transmitted, and the SCI may include a group ID (identity) and hop information. The hop information may indicate whether a UE receiving the hop information is a relay UE.

Hereinafter, the method of FIG. 6 will be described in more detail.

Figure 7:
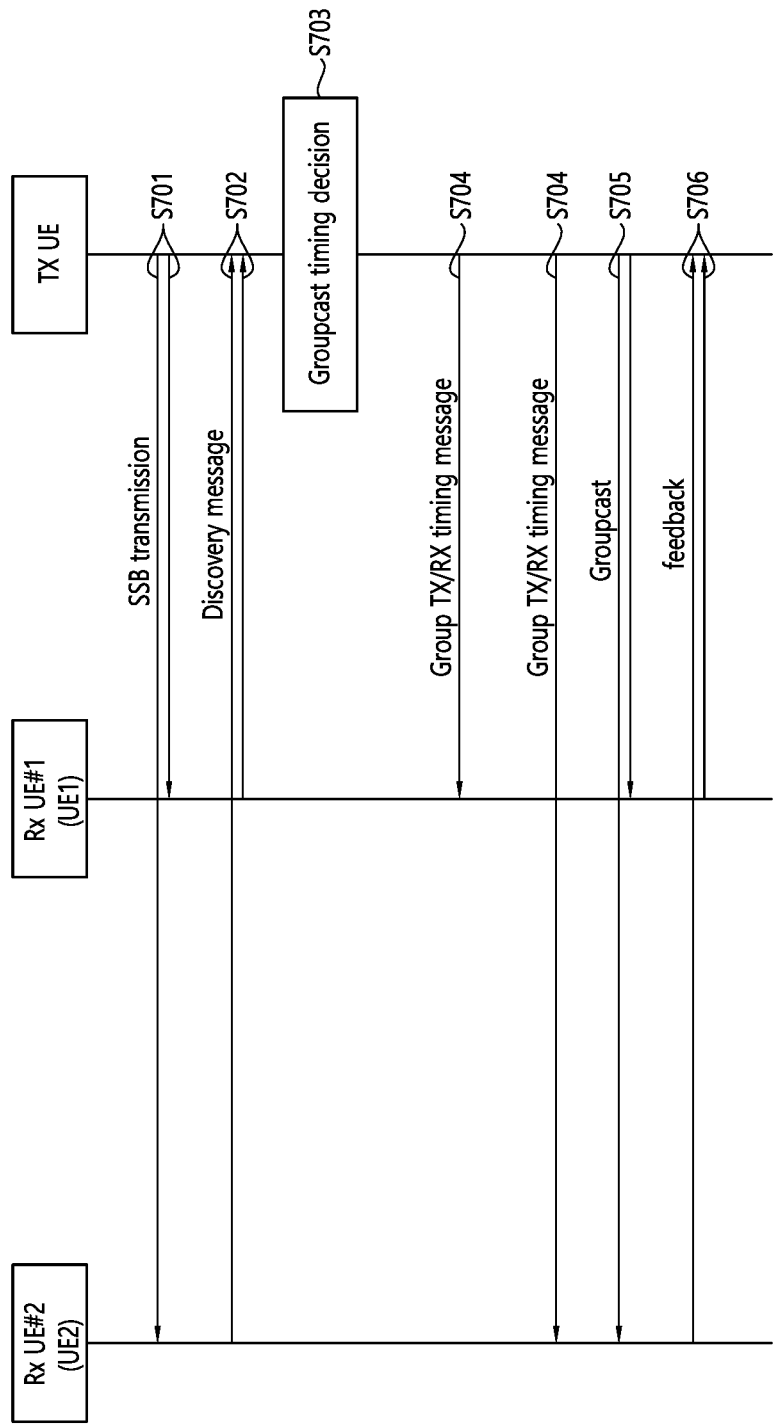
FIG. 7 illustrates signaling between a transmitting UE and a receiving UE when performing the method of FIG. 6.

FIG. 7 illustrates signaling between a transmitting UE and a receiving UE when performing the method of FIG. 6.

1. Initial Access Stage

The transmitting UE transmits the SSB in order to perform a groupcast (S701). A transmitting UE may transmit SSB through an SSB beam.

Upon receiving the SSB, the receiving UE (e.g., receiving UEs #1 and 2) transmits a discovery message to the transmitting UE (S702).

At the time of transmitting the discovery message, the receiving UE cannot know whether it will receive the groupcast. The receiving UE may include, in the discovery message, information indicating when it (the receiving UE) can receive a signal, information indicating the type of service that it (the receiving UE) can receive, and the like.

More specifically, the discovery message may include at least one of: i) a time allocation, e.g., slot information on which the receiving UE can receive the signal; ii) a frequency allocation, e.g., frequency information on which the receiving UE can receive the signal; iii) information such as RSRP when SSB is received; and iv) the type of service the receiving UE can support (e.g., it may indicate this via a bitmap).

When performing a groupcast, a group may be determined according to the type of service. The type of service may include, for example, video service, emergency service, CAN, entertainment service, and the like. The receiving UE may inform the type of service supported by the receiving UE through a bitmap, for example. Each bit of the bitmap corresponds to a corresponding service, and if the value of the bit corresponding to the corresponding service is 1, it can be interpreted as meaning that the receiving UE supports the corresponding service.

In the prior art, in order for a transmitting UE to perform a groupcast to a receiving UE, a channel environment must be measured in advance in a window sensing duration to find a duration in which data can be transmitted. However, it may be impossible to find out the channel environment of the receiving UE due to the characteristics of the beam. In the present disclosure, a transmitting UE may estimate timing suitable for performing groupcast, location of resources, etc., using a discovery message including at least one of i) to iv) information.

2. Step of Setting Transmission/Reception Duration

The transmitting UE determines groupcast timing (S703).

For example, the transmitting UE may receive the aforementioned discovery messages from a plurality of receiving UEs (e.g., receiving UEs #1 and 2) and know how many receiving UEs are aligned with the SSB beam (in this case, the transmitting UE knows that two receiving UEs are aligned because it has received discovery messages from two receiving UEs). When a groupcast is transmitted using the SSB beam, a plurality of receiving UEs can receive the group data.

In addition, the transmitting UE may know from the discovery message when multiple receiving UEs can receive the signal simultaneously when making a groupcast. Since the transmitting UE knows when the receiving UEs can receive the signal, the transmitting UE can also determine a timing for receiving the feedback signal. The timing at which the transmitting UE receives the feedback may be determined by setting a plurality of receiving UEs to send feedback at the same time, or by setting a plurality of receiving UEs to send feedback at different times.

Furthermore, if the receiving UE informs the transmitting UE of the acceptable (supportable) services via a discovery message, the transmitting UE may determine a service-specific group ID and inform the receiving UE of the group ID via a group Tx-Rx timing message. The receiving UE can determine whether the groupcast message is its own through the SCI (including the group ID or related to the group ID) provided by the transmitting UE later. For example, the receiving UE #1 informs the transmitting UE of a service that it can support (e.g., emergency service) through a discovery message, and the transmitting UE may allocate a group ID N to the emergency service and inform the receiving UE #1 through a group Tx-Rx timing message. Then, when the receiving UE #1 receives the SCI from the transmitting UE, it identifies whether the SCI is related to the group ID N (for example, it can be identified through whether the SCI includes the group ID N or whether the CRC of the SCI is masked with the group ID N) to determine whether the SCI is for the receiving UE #1.

The transmitting UE transmits a group Tx-Rx timing message to the receiving UE (S704).

The transmitting UE may provide each receiving UE with a group transmit/receive timing message containing information indicating which group it belongs to. A receiving UE that receives a group Tx-Rx timing message knows which group it belongs to based on the transmitting UE. The group transmit/receive timing message may also contain information about the time/frequency resource on which the receiving UE will transmit the feedback.

Based on the information provided by the receiving UE in the discovery message, the transmitting UE can determine the resource pool.

3. Step to Perform a Groupcast

The transmitting UE performs a groupcast (S705). In the example of FIG. 7, the transmitting UE performs a groupcast to receiving UEs #1 and 2.

The process of performing the groupcast may include, for example, a process in which a transmitting UE transmits sidelink control information (SCI) to receiving UEs and transmits data according to the SCI to the receiving UEs. The SCI includes information for groupcast. For example, a group ID and a hop number may be included.

Alternatively, the process of performing the groupcast may include a process of transmitting a configuration message (a higher layer signal such as an RRC message) for the groupcast and a process of transmitting data according to the configuration message.

4. Feedback Transmission Step

Upon receiving the groupcast signal, the receiving UE transmits feedback to the transmitting UE (S706).

Depending on the HARQ mode, the receiving UE may perform different operations. For example, HARQ mode 1 may be a HARQ mode in which ACK is fed back when the receiving UE successfully receives/decodes data, and NACK is fed back when data is not successfully received/decoded.

Let's assume that HARQ mode 1 is configured for the receiving UE. In this case, for the groupcast data transmitted by the transmitting UE, for example, receiving UE #1 can feed back ACK and receiving UE #2 can feed back NACK. Receiving UEs #1 and 2 may perform feedback through a groupcast feedback duration or a unicast feedback duration.

When NACK is received, if the transmitting UE retransmits the groupcast data in the next groupcast duration, this will result in retransmitting unnecessary data for the receiving UE #1 above. In other words, no new data can be provided to the receiving UE #1 that expects new data in the next groupcast duration. Therefore, retransmission for NACK is preferably performed using an conventional transmission beam (i.e., CSI-RS beam) in a duration other than the next groupcast duration.

In V2X, a transmitting UE may determine a duration receiving feedback. For example, the transmitting UE may set a time point at which ACK/NACK is periodically fed back through a PSFCH-related parameter among resource pool parameters. Therefore, the transmitting UE can know at what point ACK/NACK will be received. Therefore, the transmitting UE can determine the feedback reception duration for unicast or the feedback reception duration for groupcast.

Among the receiving UEs having the same feedback transmission time point, a receiving UE may transmit a NACK and another receiving UE may transmit an ACK. In this case, the data can be retransmitted using a unicast beam (conventional transmission beam, CSI-RS) instead of using an SSB beam to retransmit data to the receiving UE that sent the NACK, and new data can be transmitted using a groupcast beam (SSB beam) to multiple receiving UEs that sent the ACK.

If a number of receiving UEs have sent NACKs, the transmitting UE may retransmit the data via groupcast depending on the number of NACKs received (e.g., if the ratio of the number of NACKs to the total number of ACKs/NACKs is greater than a predetermined ratio). In this case, the receiving UE that sent the ACK may need to take additional action to determine whether the data received via the groupcast is retransmitted data or new data. For example, the NDI associated with data received via a groupcast can be used to determine whether the data is retransmitted or new.

HARQ mode 2 may be a HARQ mode in which feedback is not performed when the receiving UE successfully receives/decodes data, and NACK is fed back when data is not successfully received/decoded. That is, it is a HARQ mode in which only NACK is fed back.

When such HARQ mode 2 is configured, the transmitting UE may set the same resource pool to a plurality of receiving UEs. The receiving UEs perform NACK feedback only when the NACK occurs, and the transmitting UE performs retransmission to the receiving UEs that have transmitted the NACK. At this time, the transmitting UE may perform retransmission using the SSB beam.

In case of HARQ mode 2, the receiving UE feeds back/transmits only NACK (ACK is not fed back/transmitted). In addition, only 1-bit NACK may be mapped within one resource block. Therefore, when NACKs are received, it is possible to determine in which duration the NACKs are concentrated according to the power intensity.

Figure 8:
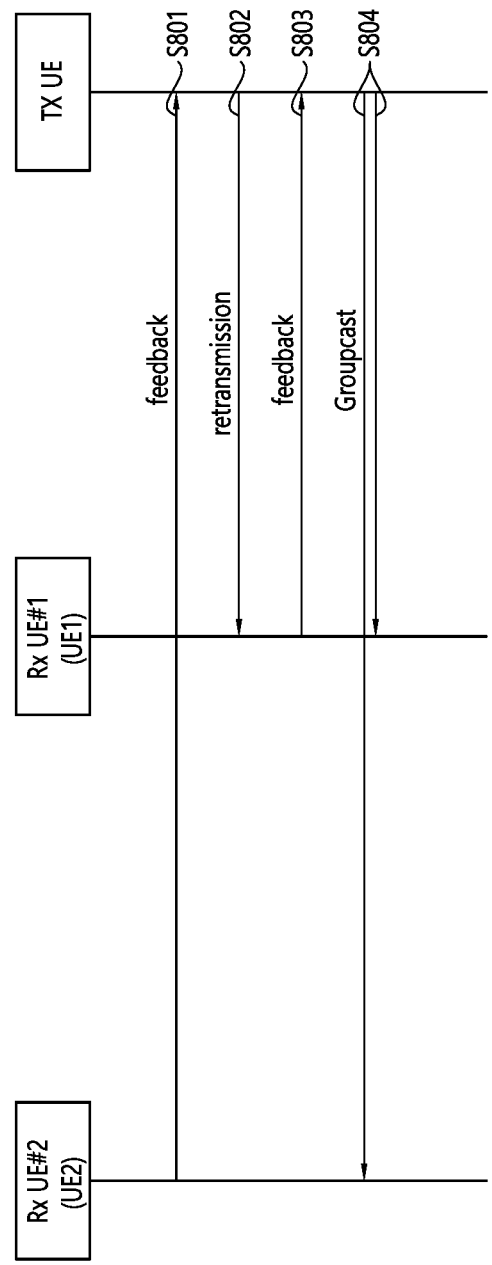
FIG. 8 illustrates an operation when a transmitting UE receives a NACK.

FIG. 8 illustrates an operation when a transmitting UE receives a NACK.

Referring to FIG. 8, after performing groupcast transmission to receiving UEs #1 and 2, the transmitting UE may receive a NACK from, for example, receiving UE #1 (S801).

The transmitting UE performs retransmission to the receiving UE #1 (S802). For example, the transmitting UE may perform retransmission to the receiving UE #1 using a unicast beam (conventional transmission beam, CSI-RS beam) in the unicast duration.

If receiving UE #1 feeds back an ACK for the retransmission (S803), the transmitting UE may perform groupcast in the next groupcast duration (S804). That is, new data can be group-cast to receiving UEs #1 and 2.

Since receiving UEs that transmit feedback transmit feedback at the same time, the transmitting UE configures/allocates different frequency resources to each receiving UE. Since the transmitting UE can know how many receiving UEs are aligned through the discovery message, it can configure/allocate different frequency resources to each of the aligned receiving UEs.

According to the present disclosure, rather than transmitting data to a plurality of UEs by transmitting the same data multiple times using different beams, the data is transmitted to a plurality of UEs aligned to the SSB beam using an SSB beam having a relatively large transmission angle (width), which is highly resource efficient. In addition, for UEs that feedback NACK for group-cast data, as in the past, using a beam (CSI-RS beam) with a narrow transmission angle (width), data is retransmitted in the unicast duration instead of the groupcast duration, and new data is transmitted in the groupcast duration, thereby increasing the efficiency of the groupcast operation.

Figure 9:
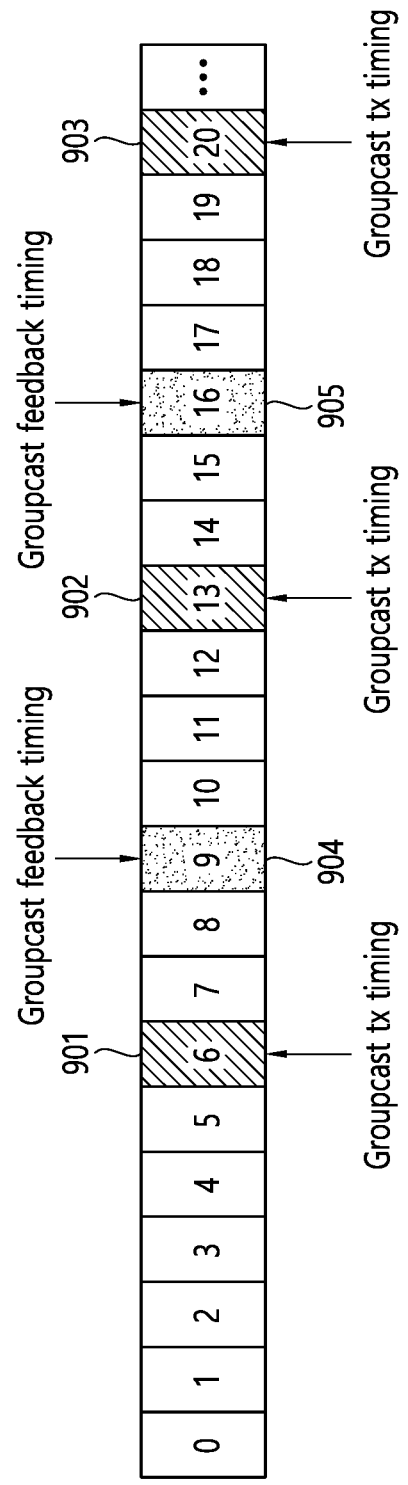
FIG. 9 illustrates groupcast transmission timing and groupcast feedback timing.

FIG. 9 illustrates groupcast transmission timing and groupcast feedback timing.

Referring to FIG. 9, groupcast transmission timing may be periodically set. For example, groupcast transmission timing may be set in cycles of 7 slots, such as slot 6 (901), slot 13 (902), and slot 20 (903).

Groupcast feedback timing may be set to correspond to groupcast transmission timing. For example, slot 9 (904), three slots later corresponding to slot 6 (901) which is the groupcast transmission timing, is set as the groupcast feedback timing, and slot 16 (905), which is three slots later, corresponding to slot 13 (902) which is the groupcast transmission timing, may be set as the groupcast feedback timing.

Figure 10:
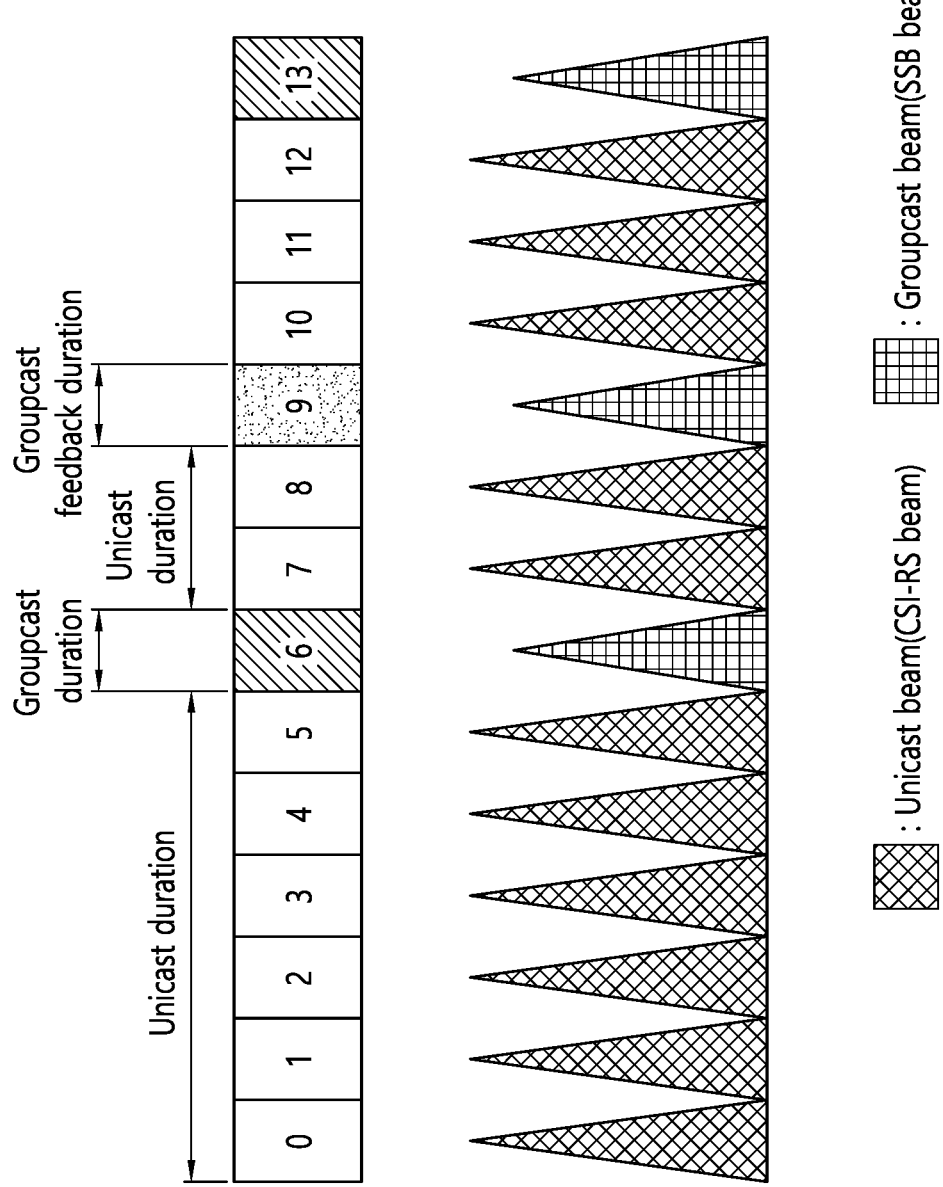
FIG. 10 illustrates beams used in a groupcast duration, a unicast duration, and a groupcast feedback duration.

FIG. 10 illustrates beams used in a groupcast duration, a unicast duration, and a groupcast feedback duration.

Referring to FIG. 10, a transmitting UE may use a unicast beam, i.e., a CSI-RS beam, in a unicast duration, and may use a groupcast beam, i.e., an SSB beam, in a groupcast duration. SSB beams can also be used in the groupcast feedback duration.

<Groupcast Relay Operation>

When a transmitting UE transmits SCI, it may include hop information in the SCI. For example, if the hop information included in the SCI informs that hop=2, the receiving UE can deliver/relay data to another UE within the same transmittable group that is 1 hop away. That is, the receiving UE may operate as a relay UE. A transmitting UE can transmit data to a plurality of different UEs at once using an SSB beam. In addition, since it is known how many UEs are aligned on one SSB beam, data can be relayed more efficiently.

Figure 11:
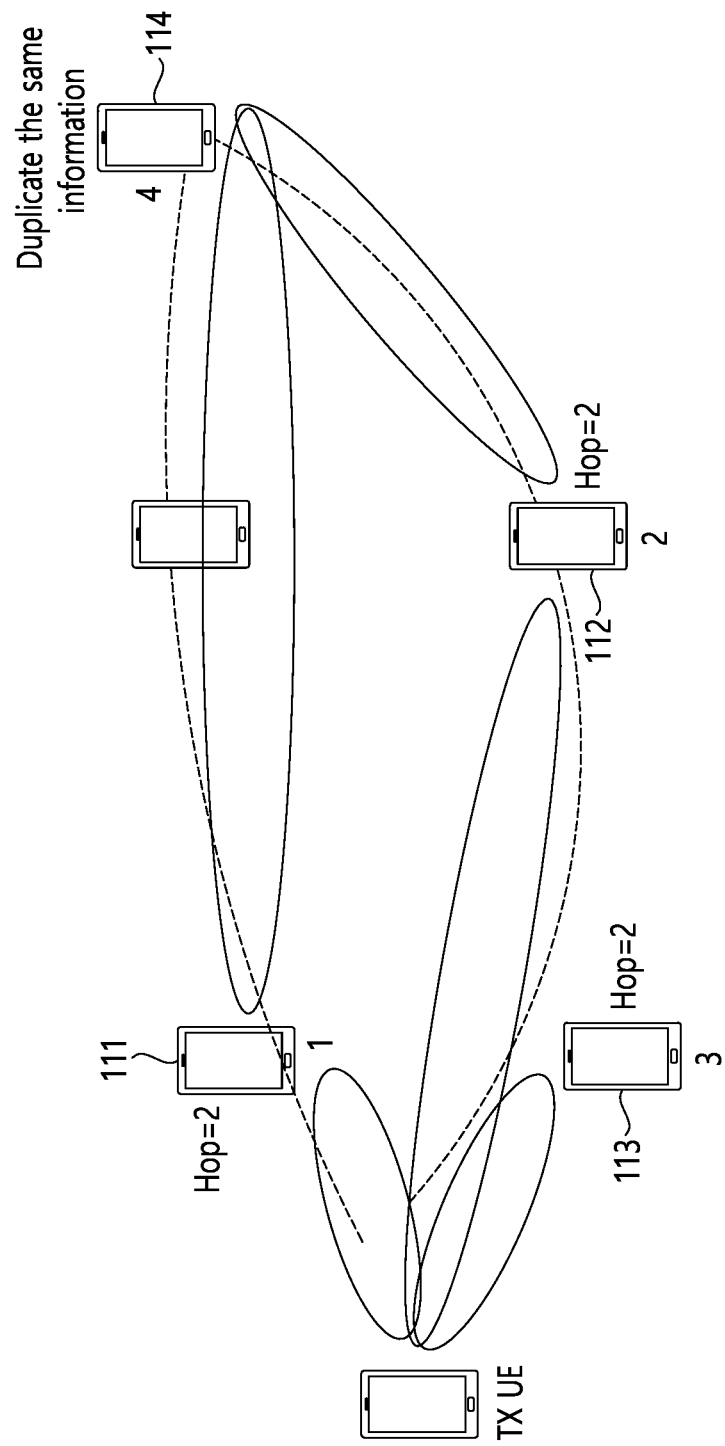
FIG. 11 illustrates a groupcast relay operation in the prior art.

FIG. 11 illustrates a groupcast relay operation in the prior art.

Referring to FIG. 11, in the prior art, when it is assumed that a transmitting UE performs a groupcast, hop information is set to, for example, hop=2 and data is transmitted. Then, receiving UEs #1 (111) and #2 (112) that have received the data transmit the data to other nearby UEs. At this time, in some cases, for example, receiving UE #4 (114) may receive data from both receiving UEs #1 (111) and #2 (112). That is, the receiving UE #4 114 may receive duplicated data. This may be a waste of resources and may cause unnecessary interference.

Figure 12:
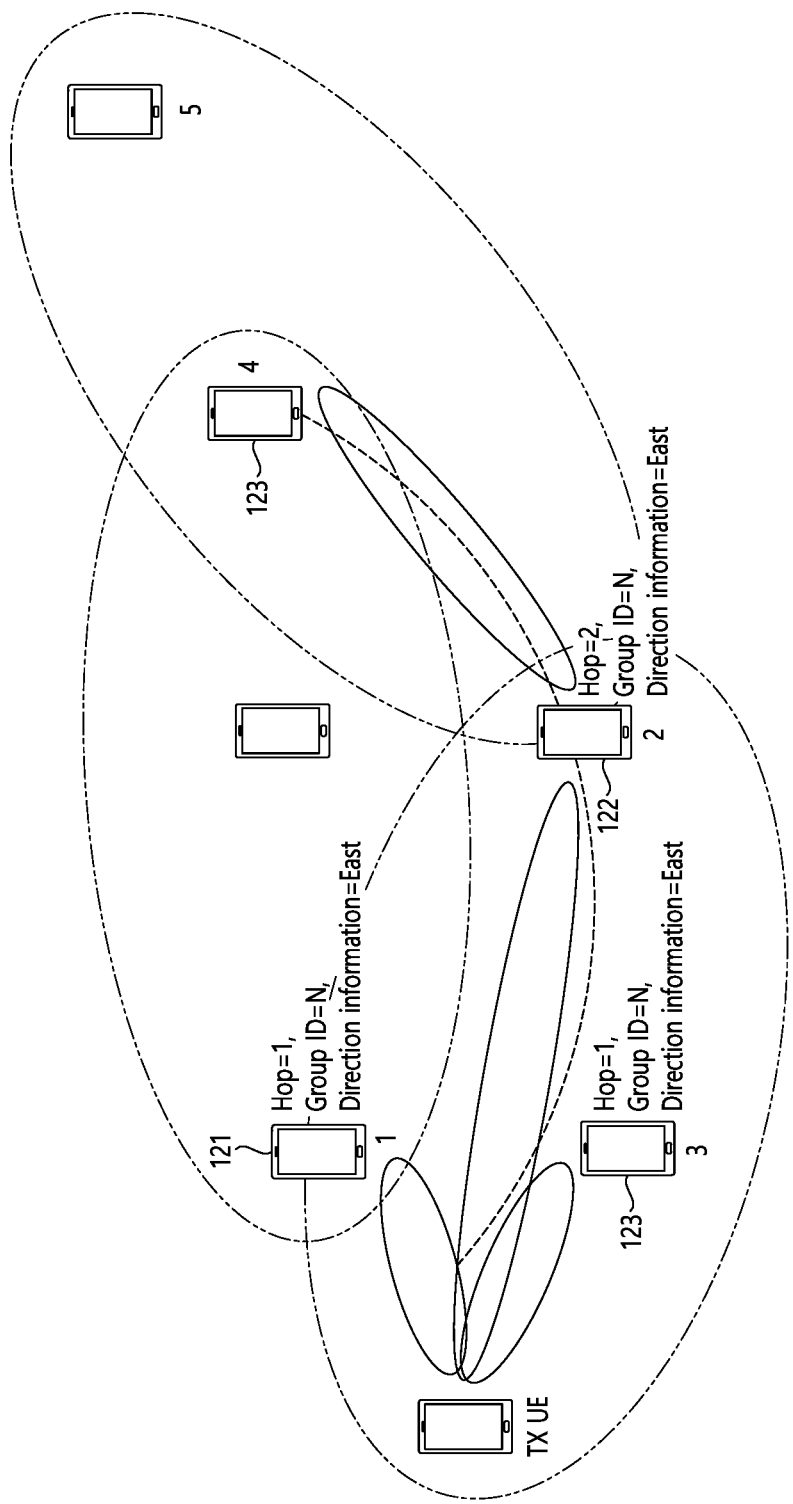
FIG. 12 illustrates a groupcast relay operation according to the present disclosure.

FIG. 12 illustrates a groupcast relay operation according to the present disclosure.

Referring to FIG. 12, a transmitting UE may provide direction information to a receiving UE when performing a groupcast. For example, when performing a groupcast, a transmitting UE provides an SCI, and the SCI may include hop information, a group ID, and direction information. In the SCI for a UE to receive groupcast data, hop information, group ID, and direction information may be independently set for each UE.

For example, the SCI for receiving UE #1 121 includes hop information (Hop=1), group ID=N, and direction information=East, and the SCI for receiving UE #2 122 includes hop information (Hop=2), group ID=N, and direction information=East, and the SCI for receiving UE #3 may include hop information (Hop=1), group ID=N, and direction information=East. In this case, it can be said that the receiving UE #2 is set as a relay UE for the east direction based on the transmitting UE.

Since the content of the SCI may be different for each UE, a case may occur where independent SCI is transmitted to some UEs and the same SCI is provided to the remaining UEs. Alternatively, information common to all UEs may be provided in the first SCI transmitted through the PSCCH, and different information for each UE may be provided in the second SCI additionally transmitted through the PSSCH. In this case, all UEs may receive the same first SCI and receive information specific to themselves through a second SCI.

The difference between groupcast and unicast is that a plurality of UEs can simultaneously receive SCI and the same data can be received at the same resource location. Therefore, the transmitting UE selects a UE (relay UE) capable of relaying data best among UEs capable of receiving the SSB beam and sets the hop information to hop=2 (that is, the UE receiving the data is configured to transmit data to another UE once) and the remaining UEs set hop information to hop=1 (i.e., the UE receiving the data is set not to transmit data to other UEs).

For example, a relay UE may be selected by applying the following method.
 1. First, a receiving UE having the best channel environment, that is, a receiving UE having the most empty resources available for reception may be selected.
 2. In consideration of the transmission direction, a UE located at the outermost edge of the coverage of the transmitting UE, for example, when a groupcast is required in a specific direction, a UE farthest away from the SSB beam in the specific direction may be selected.
 3. Multiple UEs may be selected as relay UEs.
 4. When groupcast is performed in different directions based on a transmitting UE, a relay UE may be selected for each direction. For example, when a transmitting UE performs a groupcast in north, east, and south directions, UE #1 in the north direction, UE #2 in the east direction, and UE #3 in the south direction may be selected/designated as relay UEs.

Figure 13:
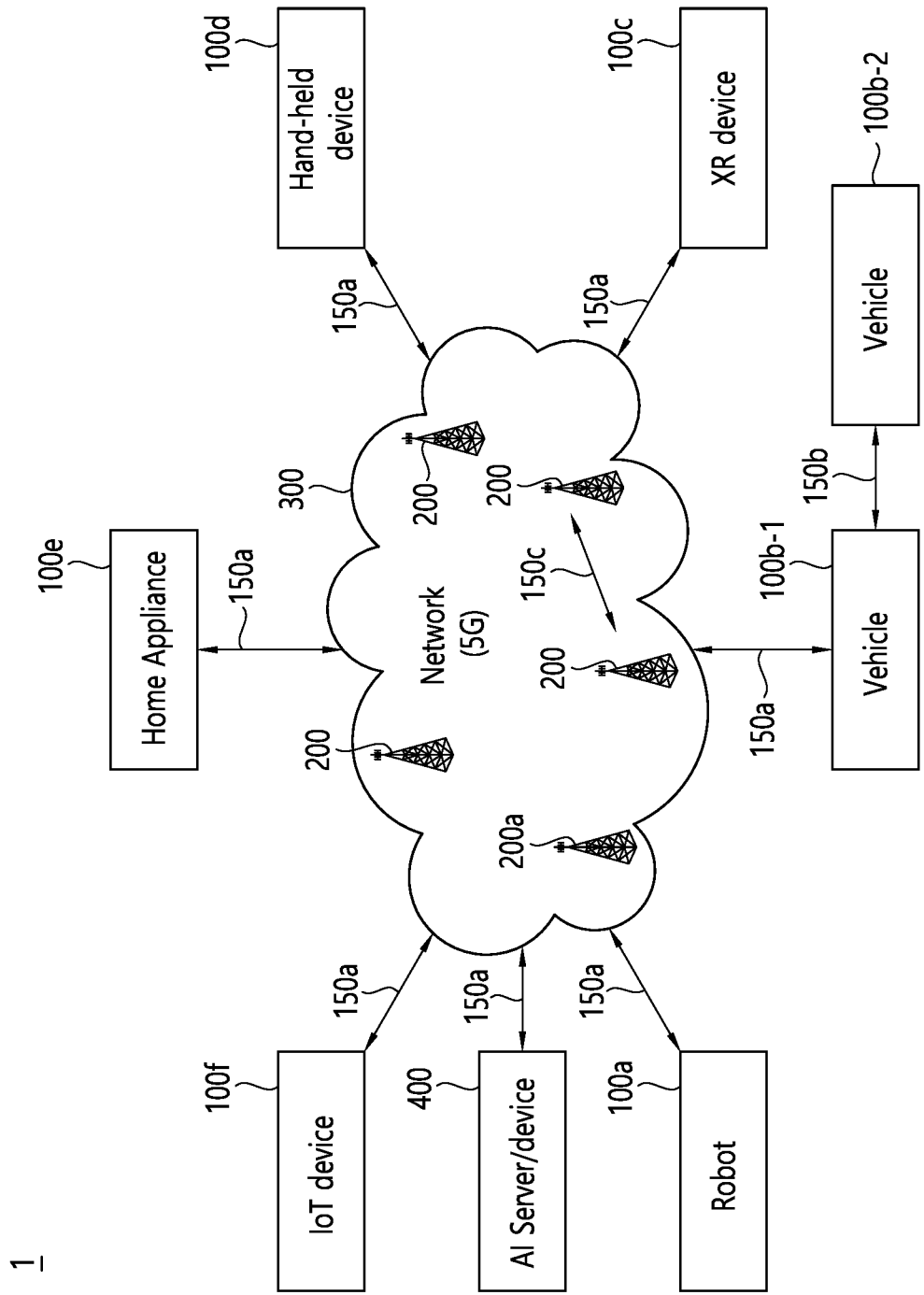
FIG. 13 illustrates a communication system 1 applied to this specification.

FIG. 13 illustrates a communication system 1 applied to this specification.

Referring to FIG. 13, a communication system 1 applied to the present specification includes a wireless device, a base station, and a network. The wireless devices represent devices performing communication using radio access technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The handheld device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, a base station and a network may also be implemented as a wireless device, and a specific wireless device 200*a* may operate as a base station/network node to other wireless devices.

Here, the wireless communication technology implemented in the wireless device of the present specification may include narrowband IoT (NB-IoT) for low-power communication as well as LTE, NR, and 6G. For example, the NB-IoT technology may be an example of a LPWAN (Low Power Wide Area Network) technology, and may be implemented in standards such as LTE Cat NB1 and/or LTE Cat NB2, and is not limited to the above-mentioned name Additionally or alternatively, the wireless communication technology implemented in the wireless device of the present specification may perform communication based on LTE-M technology. For example, the LTE-M technology may be an example of an LPWAN technology, and may be called by various names such as enhanced MTC (eMTC). For example, LTE-M technology may be implemented in at least one of various standards such as 1) LTE CAT 0, 2) LTE Cat M1, 3) LTE Cat M2, 4) LTE non-BL (Non-Bandwidth Limited), 5) LTE-MTC, 6) LTE MTC, and/or 7) LTE M, and is not limited to the above-described name. Additionally or alternatively, the wireless communication technology implemented in the wireless device of the present specification may include at least one of ZigBee, Bluetooth, and/or LPWAN in consideration of low-power communication, and it is not limited to the above-mentioned names. For example, the ZigBee technology may create PANs (Personal Area Networks) related to small/low-power digital communication based on various standards such as IEEE 802.15.4, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connection 150*a*, 150*b*, and 150*c* may be performed between the wireless devices 100*a* to 100f/base station 200 and the base station 200/base station 200. Here, wireless communication/connection refers to various wireless connections such as uplink/downlink communication 150a, sidelink communication 150b (or D2D communication), and inter-base station communication 150c (e.g. relay, Integrated Access Backhaul (IAB)). This can be done through technology (e.g. 5G NR). Through the wireless communication/connection 150a, 150b, and 150c, a wireless device and a base station/wireless device, and a base station and a base station may transmit/receive radio signals to each other. For example, the wireless communication/connections 150a, 150b, and 150c may transmit/receive signals through various physical channels. To this end, based on various proposals herein, at least some of the following may be performed: various configuration information setting processes for transmitting/receiving wireless signals, various signal processing processes (e.g., channel encoding/decoding, modulation/demodulation, resource mapping/demapping, etc.), resource allocation processes, etc.

The following describes examples of wireless devices to which this specification applies.

Figure 14:
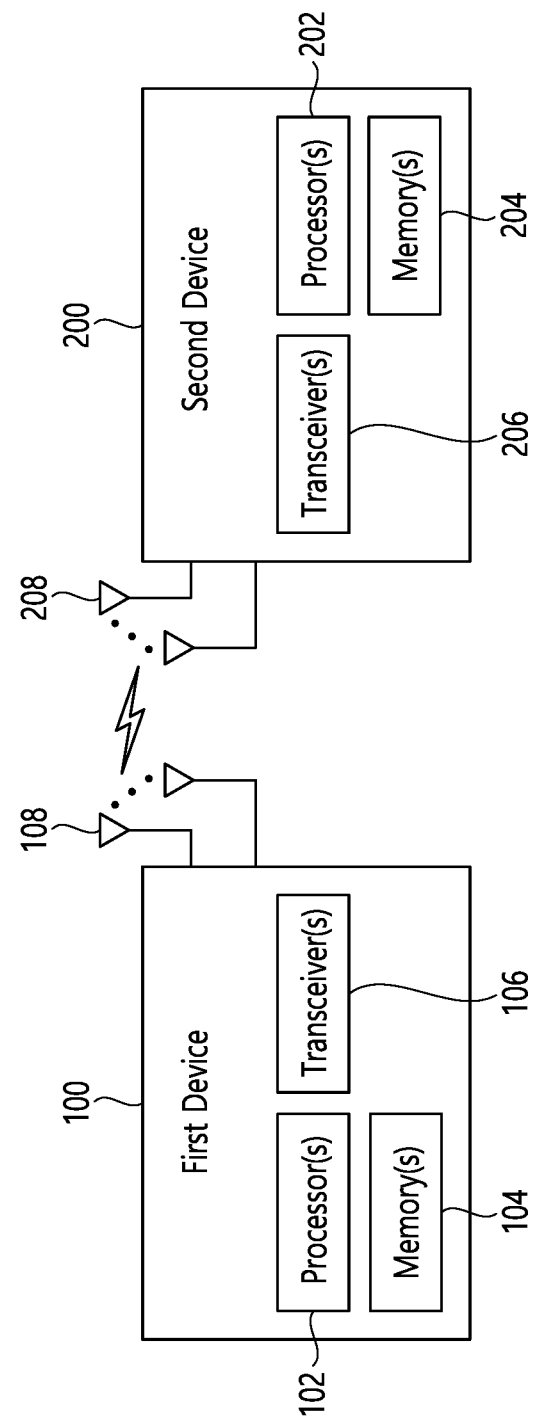
FIG. 14 illustrates a wireless device applicable to the present specification.

FIG. 14 illustrates a wireless device applicable to the present specification.

Referring to FIG. 14, the first wireless device 100 and the second wireless device 200 may transmit and receive radio signals through various radio access technologies (e.g., LTE, NR). Here, {the first wireless device 100, the second wireless device 200} is the {wireless device 100x, the base station 200} of FIG. 13 and/or the {wireless device 100x, the wireless device 100x} can correspond.

The first wireless device 100 includes at least one processor 102 and at least one memory 104 and may further include at least one transceiver 106 and/or at least one antenna 108. The processor 102 may be configured to control the memory 104 and/or the transceiver 106 and to implement the descriptions, functions, procedures, proposals, methods, and/or operational flowcharts disclosed herein. For example, the processor 102 may process information in the memory 104 to generate first information/signal and may then transmit a radio signal including the first information/signal through the transceiver 106. In addition, the processor 102 may receive a radio signal including second information/signal through the transceiver 106 and may store information obtained from signal processing of the second information/signal in the memory 104. The memory 104 may be connected to the processor 102 and may store various pieces of information related to the operation of the processor 102. For example, the memory 104 may store a software code including instructions to perform some or all of processes controlled by the processor 102 or to perform the descriptions, functions, procedures, proposals, methods, and/or operational flowcharts disclosed herein. Here, the processor 102 and the memory 104 may be part of a communication modem/circuit/chip designed to implement a radio communication technology (e.g., LTE or NR). The transceiver 106 may be connected with the processor 102 and may transmit and/or receive a radio signal via the at least one antennas 108. The transceiver 106 may include a transmitter and/or a receiver. The transceiver 106 may be replaced with a radio frequency (RF) unit. In this specification, the wireless device may refer to a communication modem/circuit/chip. The first wireless device may be, for example, a transmitting UE.

The second wireless device 200 includes at least one processor 202 and at least one memory 204 and may further include at least one transceiver 206 and/or at least one antenna 208. The processor 202 may be configured to control the memory 204 and/or the transceiver 206 and to implement the descriptions, functions, procedures, proposals, methods, and/or operational flowcharts disclosed herein. For example, the processor 202 may process information in the memory 204 to generate third information/signal and may then transmit a radio signal including the third information/signal through the transceiver 206. In addition, the processor 202 may receive a radio signal including fourth information/signal through the transceiver 206 and may store information obtained from signal processing of the fourth information/signal in the memory 204. The memory 204 may be connected to the processor 202 and may store various pieces of information related to the operation of the processor 202. For example, the memory 204 may store a software code including instructions to perform some or all of processes controlled by the processor 202 or to perform the descriptions, functions, procedures, proposals, methods, and/or operational flowcharts disclosed herein. Here, the processor 202 and the memory 204 may be part of a communication modem/circuit/chip designed to implement a radio communication technology (e.g., LTE or NR). The transceiver 206 may be connected with the processor 202 and may transmit and/or receive a radio signal via the at least one antennas 208. The transceiver 206 may include a transmitter and/or a receiver. The transceiver 206 may be replaced with an RF unit. In this specification, the wireless device may refer to a communication modem/circuit/chip. The second wireless device may be, for example, a receiving UE. The receiving UE receives the SSB from the transmitting UE through an SSB beam, transmits a discovery message to the transmitting UE in response to the SSB, and receives a group transmit/receive timing message indicating a groupcast transmission timing based on the discovery message from the transmitting UE, and receives groupcast data using the SSB beam from the transmitting UE at the groupcast transmission timing.

Hereinafter, hardware elements of the wireless devices 100 and 200 are described in detail. At least one protocol layer may be implemented, but limited to, by the at least one processor 102 and 202. For example, the at least one processor 102 and 202 may implement at least one layer (e.g., a functional layer, such as PHY, MAC, RLC, PDCP, RRC, and SDAP layers). The at least one processor 102 and 202 may generate at least one protocol data unit (PDU) and/or at least one service data unit (SDU) according to the descriptions, functions, procedures, proposals, methods, and/or operational flowcharts disclosed herein. The at least one processor 102 and 202 may generate a message, control information, data, or information according to the descriptions, functions, procedures, proposals, methods, and/or operational flowcharts disclosed herein. The at least one processor 102 and 202 may generate a signal (e.g., a baseband signal) including a PDU, an SDU, a message, control information, data, or information according to the functions, procedures, proposals, and/or methods disclosed herein and may provide the signal to the at least one transceiver 106 and 206. The at least one processor 102 and 202 may receive a signal (e.g., a baseband signal) from the at least one transceiver 106 and 206 and may obtain a PDU, an SDU, a message, control information, data, or information according to the descriptions, functions, procedures, proposals, methods, and/or operational flowcharts disclosed herein.

The at least one processor 102 and 202 may be referred to as a controller, a microcontroller, a microprocessor, or a microcomputer. The at least one processor 102 and 202 may be implemented by hardware, firmware, software, or a combination thereof. For example, at least one application-specific integrated circuit (ASIC), at least one digital signal processor (DSP), at least one digital signal processing devices (DSPD), at least one programmable logic devices (PLD), or at least one field programmable gate array (FPGA) may be included in the at least one processor 102 and 202. The descriptions, functions, procedures, proposals, methods, and/or operational flowcharts disclosed herein may be implemented using firmware or software, and the firmware or software may be configured to include modules, procedures, functions, and the like. The firmware or software configured to perform the descriptions, functions, procedures, proposals, methods, and/or operational flowcharts disclosed herein may be included in the at least one processor 102 and 202 or may be stored in the at least one memory 104 and 204 and may be executed by the at least one processor 102 and 202. The descriptions, functions, procedures, proposals, methods, and/or operational flowcharts disclosed herein may be implemented in the form of a code, an instruction, and/or a set of instructions using firmware or software.

The at least one memory 104 and 204 may be connected to the at least one processor 102 and 202 and may store various forms of data, signals, messages, information, programs, codes, indications, and/or commands. The at least one memory 104 and 204 may be configured as a ROM, a RAM, an EPROM, a flash memory, a hard drive, a register, a cache memory, a computer-readable storage medium, and/or a combination thereof. The at least one memory 104 and 204 may be disposed inside and/or outside the at least one processor 102 and 202. In addition, the at least one memory 104 and 204 may be connected to the at least one processor 102 and 202 through various techniques, such as a wired or wireless connection.

The at least one transceiver 106 and 206 may transmit user data, control information, a radio signal/channel, or the like mentioned in the methods and/or operational flowcharts disclosed herein to at least different device. The at least one transceiver 106 and 206 may receive user data, control information, a radio signal/channel, or the like mentioned in the descriptions, functions, procedures, proposals, methods, and/or operational flowcharts disclosed herein from at least one different device. For example, the at least one transceiver 106 and 206 may be connected to the at least one processor 102 and 202 and may transmit and receive a radio signal. For example, the at least one processor 102 and 202 may control the at least one transceiver 106 and 206 to transmit user data, control information, or a radio signal to at least one different device. In addition, the at least one processor 102 and 202 may control the at least one transceiver 106 and 206 to receive user data, control information, or a radio signal from at least one different device. The at least one transceiver 106 and 206 may be connected to the at least one antenna 108 and 208 and may be configured to transmit or receive user data, control information, a radio signal/channel, or the like mentioned in the descriptions, functions, procedures, proposals, methods, and/or operational flowcharts disclosed herein through the at least one antenna 108 and 208. In this document, the at least one antenna may be a plurality of physical antennas or may be a plurality of logical antennas (e.g., antenna ports). The at least one transceiver 106 and 206 may convert a received radio signal/channel from an RF band signal into a baseband signal in order to process received user data, control information, a radio signal/channel, or the like using the at least one processor 102 and 202. The at least one transceiver 106 and 206 may convert user data, control information, a radio signal/channel, or the like, processed using the at least one processor 102 and 202, from a baseband signal to an RF bad signal. To this end, the at least one transceiver 106 and 206 may include an (analog) oscillator and/or a filter.

Figure 15:
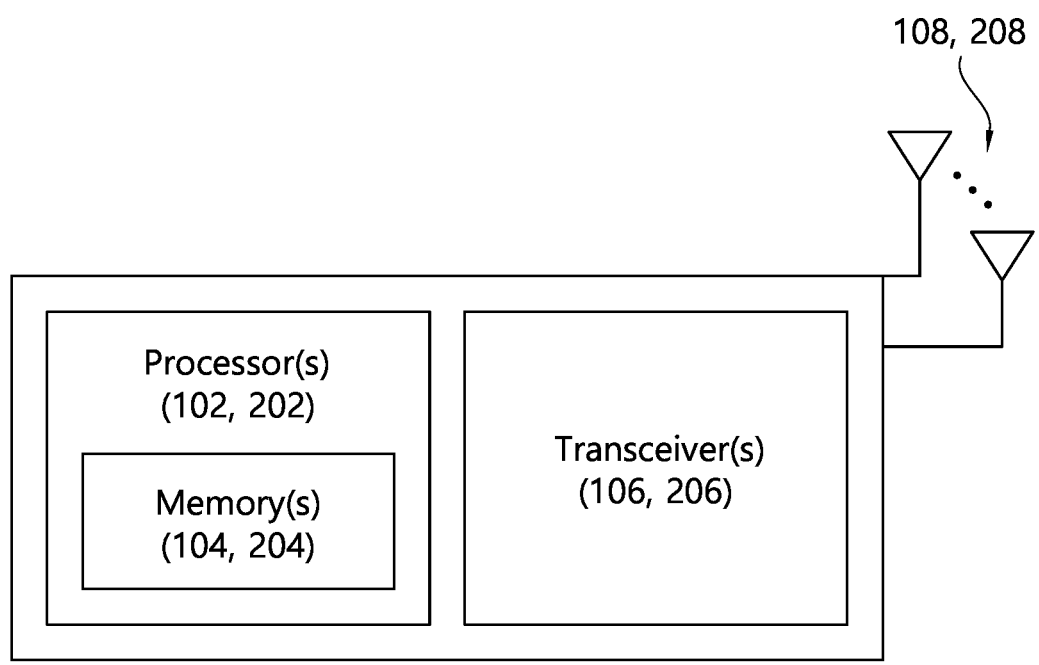
FIG. 15 shows another example of a wireless device applicable to the present specification.

FIG. 15 shows another example of a wireless device applicable to the present specification.

According to FIG. 15, a wireless device may include at least one processor 102, 202, at least one memory 104, 204, at least one transceiver 106, 206, and one or more antennas 108, 208.

The example of the wireless device described in FIG. 15 is different from the example of the wireless described in FIG. 14 in that the processors 102 and 202 and the memories 104 and 204 are separated in FIG. 14 whereas the memories 104 and 204 are included in the processors 102 and 202 in the example of FIG. 15.

Here, since the detailed description of the processors 102 and 202, the memories 104 and 204, the transceivers 106 and 206, and one or more antennas 108 and 208 have been described above, in order to avoid repetition of unnecessary description, repeated description is omitted.

The present disclosure may be performed by at least one computer readable medium (CRM) including instructions executed by at least one processor. The operations performed by the processor according to the instructions include transmitting a synchronization signal block (SSB) via an SSB beam, receiving a discovery message in response to the SSB from each of a plurality of UEs, determining, based on the discovery message, a groupcast transmission timing for specific UEs among the plurality of UEs, transmitting a group transmission-reception (Tx-Rx) timing message informing of the groupcast transmission timing to the specific UEs and performing a groupcast transmission using the SSB beam to the specific UEs at the groupcast transmission timing.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:
1. A method comprising:
transmitting, by a user equipment (UE), a sidelink synchronization signal/physical sidelink broadcast channel block (S-SSB);
receiving, by the UE, a discovery message from each of a plurality of UEs;
determining, by the UE based on the discovery message, a groupcast transmission timing for specific UEs among the plurality of UEs;
transmitting, by the UE, a group transmission-reception (Tx-Rx) timing message informing the specific UEs of the groupcast transmission timing;
transmitting, by the UE, sidelink control information (SCI) to the specific UEs; and
performing, by the UE based on the SCI, a groupcast transmission via an SSB beam used for transmission of the S-SSB to the specific UEs at the groupcast transmission timing,
wherein the discovery message is received from each of the plurality of UEs in response to the S-SSB, and wherein the SCI comprises hop information whose value is related to whether a specific UE receiving the SCI operates as a relay UE.

2. The method of claim 1, wherein the specific UEs are UEs capable of receiving a channel state information-reference signal (CSI-RS) that is quasi co-located (QCL) with the S-SSB.

3. The method of claim 1, wherein the discovery message comprises at least one of information about a time point at which a receiving UE that has transmitted the discovery message can receive data from the UE, frequency information on which the data can be received, power information on the S-SSB, or information related to a type of service supported by the receiving UE.

4. The method of claim 3, wherein based on the discovery message including information related to the type of service supported by the receiving UE,
the UE determines a group identity (ID) for the receiving UE based on the information related to the type of service supported by the receiving UE, and informs the receiving UE of the group ID through the group Tx-Rx timing message.

5. The method of claim 4, wherein the UE transmits sidelink control information (SCI) to the receiving UE, and
wherein whether the SCI is for the receiving UE is identified based on the group ID.

6. The method of claim 1, wherein an acknowledgment/negative-acknowledgment (ACK/NACK) is received from at least one of the specific UEs, and
wherein the UE performs data retransmission using a beam other than the S-SSB beam at a timing other than the groupcast transmission timing only for a UE receiving the NACK.

7. A user equipment (UE) comprising:
at least one transceiver;
at least one memory; and
at least one processor operably connectable to the at least one transceiver and the at least one memory,
wherein the at least one memory stores instructions that, based on being executed by the at least one processor, cause the at least one processor to perform operations comprising:
transmitting a sidelink synchronization signal/physical sidelink broadcast channel block (S-SSB);
receiving a discovery message from each of a plurality of UEs;
determining, based on the discovery message, a groupcast transmission timing for specific UEs among the plurality of UEs;
transmitting a group transmission-reception (Tx-Rx) timing message informing the specific UEs of the groupcast transmission timing;
transmitting sidelink control information (SCI) to the specific UEs; and
perform a groupcast transmission via an SSB beam used for transmission of the S-SSB to the specific UEs at the groupcast transmission timing,
wherein the discovery message is received from each of the plurality of UEs in response to the S-SSB, and
wherein the SCI comprises hop information whose value is related to whether a specific UE receiving the SCI operates as a relay UE.

8. The UE of claim 7, wherein the specific UEs are UEs capable of receiving a channel state information-reference signal (CSI-RS) that is quasi co-located (QCL) with the S-SSB.

9. The UE of claim 7, wherein the discovery message comprises at least one of information about a time point at which a receiving UE that has transmitted the discovery message can receive data from the UE, frequency information on which the data can be received, power information on the S-SSB, or information related to a type of service supported by the receiving UE.

10. The UE of claim 9, wherein based on the discovery message including information related to the type of service supported by the receiving UE,
the transmitting UE determines a group identity (ID) for the receiving UE based on the information indicating the type of service supported by the receiving UE, and informs the receiving UE of the group ID through the group Tx-Rx timing message.

11. The UE of claim 10, wherein the UE transmits sidelink control information (SCI) to the receiving UE, and
wherein whether the SCI is for the receiving UE is identified based on the group ID.

12. The UE of claim 7, wherein an acknowledgment/negative-acknowledgment (ACK/NACK) is received from at least one of the specific UEs, and
wherein the UE performs data retransmission using a beam other than the S-SSB beam at a timing other than the groupcast transmission timing only for a UE receiving the NACK.

13. A method comprising:
receiving, by a user equipment (UE), a sidelink synchronization signal/physical sidelink broadcast channel block (S-SSB) from a transmitting UE;
transmitting, by the UE, a discovery message to the transmitting UE;
receiving, by the UE, a group transmission-reception (Tx-Rx) timing message related to a groupcast transmission timing from the transmitting UE;
receiving, by the UE, sidelink control information (SCI) from the transmitting UE; and
receiving, by the UE, groupcast data from the transmitting UE via an the SSB beam related to the S-SSB at the groupcast transmission timing,
wherein the discovery message is transmitted in response to the S-SSB, and
wherein the SCI comprises hop information whose value is related to whether the UE operates as a relay UE.

* * * * *